(12) United States Patent
Yamada et al.

(10) Patent No.: US 7,370,328 B2
(45) Date of Patent: May 6, 2008

(54) METHOD FOR ASSIGNING JOB IN PARALLEL PROCESSING METHOD AND PARALLEL PROCESSING METHOD

(75) Inventors: Sou Yamada, Nakai-machi (JP);
Shinjiro Inabata, Nakai-machi (JP);
Nobuaki Miyakawa, Nakai-machi (JP);
Hajime Takashima, Tokyo (JP);
Kunihiro Kitamura, Tokyo (JP);
Unpei Nagashima, Tokyo (JP)

(73) Assignees: Honda Motor Co., Ltd., Tokyo (JP);
Taisho Pharmaceutical Co., Ltd., Tokyo (JP)

( * ) Notice: Subject to any disclaimer, the term of this patent is extended or adjusted under 35 U.S.C. 154(b) by 739 days.

(21) Appl. No.: 10/257,913

(22) PCT Filed: Apr. 25, 2002

(86) PCT No.: PCT/JP01/03554

§ 371 (c)(1),
(2), (4) Date: Oct. 18, 2002

(87) PCT Pub. No.: WO01/84343

PCT Pub. Date: Nov. 8, 2001

(65) Prior Publication Data
US 2003/0204576 A1    Oct. 30, 2003

(51) Int. Cl.
*G06F 9/44* (2006.01)
*G06F 15/16* (2006.01)
*G06F 15/163* (2006.01)

(52) U.S. Cl. .................. 718/105; 718/102; 709/224

(58) Field of Classification Search .................. 718/1, 718/100–108; 709/200–253
See application file for complete search history.

(56) References Cited

U.S. PATENT DOCUMENTS 5,381,534 A * 1/1995 Shi ............................. 709/203

(Continued)

FOREIGN PATENT DOCUMENTS

JP         A 5-324581         12/1993

(Continued)

OTHER PUBLICATIONS

Takashima et al., "A Novel Algorithm for Large-Scale Fock Matrix Generation with Small Local Distributed Memory Parallel Architecture" Journal of Chemical Software, vol. 6 No. 3, pp. 85-103 (Apr. 10, 2003).*

(Continued)

*Primary Examiner*—Lewis A. Bullock, Jr.
(74) *Attorney, Agent, or Firm*—Oliff & Berridge, PLC

(57) ABSTRACT

When parallel processing is executed by parallel computers composed of a host computer and a plurality of processors connected to the host computer through a common bus, there is provided a method of assigning jobs to respective processors with high efficiency. A job in which a ratio between a communication time and a calculation time is larger than a predetermined value or larger than a fraction of processors and a job in which a ratio between a communication time and a calculation time is smaller than a predetermined value or smaller than a fraction of processors can be alternately assigned to respective processors. Alternatively, jobs are assigned to respective processors in such a manner that a plurality of processors and a plurality of jobs are divided into a plurality of groups in a one-to-one relation, jobs in which sizes comprising communication time and calculation time and ratios between the communication times and the calculation times approximate to each other may belong to different job groups and the order in which the jobs in which the sizes comprising the communication time and the calculation time and the ratios between the communication times and the calculation times approximate to each other are assigned within respective job groups may differ from each other among a plurality of job groups.

31 Claims, 27 Drawing Sheets

U.S. PATENT DOCUMENTS

| | | | | |
|---|---|---|---|---|
| 5,587,922 | A | * | 12/1996 | Hendrickson et al. .......... 716/2 |
| 5,692,193 | A | * | 11/1997 | Jagannathan et al. ....... 718/106 |
| 5,845,116 | A | * | 12/1998 | Saito et al. ................. 718/103 |
| 5,889,989 | A | | 3/1999 | Robertazzi et al. |
| 5,951,634 | A | * | 9/1999 | Sitbon et al. ............... 718/105 |
| 5,987,468 | A | * | 11/1999 | Singh et al. ................ 707/100 |
| 6,370,560 | B1 | * | 4/2002 | Robertazzi et al. ......... 718/105 |
| 6,578,064 | B1 | * | 6/2003 | Saito et al. ................. 718/103 |

FOREIGN PATENT DOCUMENTS

| | | |
|---|---|---|
| JP | A 6-35870 | 2/1994 |
| JP | A 6-243112 | 9/1994 |
| JP | A 7-295942 | 11/1995 |
| JP | A 8-185377 | 7/1996 |
| JP | A 2000-298658 | 10/2000 |
| JP | A 2000-305923 | 11/2000 |

OTHER PUBLICATIONS

Nagashima et al., "Development of a Special Purpose Computer for Molecular Orbital Calculation: MOE—Integral Cutoff and Fock Matrix Generation by RT Parallelization," 2000 nen Kinen Heiretsu Shori Symposium, JSPP2000 Ronbunshuu, p. 170 (Jun. 2000), document cited on International Search Report filed Dec. 11, 2002.*

Ickikawa, Shuichi, "Mathematical Programming Approach for Static Load Balancing of Parallel PDE Solver," Proc. of the 16th IASTED Int. Conference on Applied Informatics, pp. 112-114 (Feb. 1998), document cited on Int'l Srch. Rpt filed on Dec. 11, 2002.*

Shirakawa et al., "The Architecture of a Molecular Orbital calculation Engine (MOE)", Technical Report of IEICE, CPSY96-46 (May 1996), pp. 45-50. (w/abstract).

Inabata et al., "PPRAM-MOE: A Processing Node LSI of The Molecular Orbital Calculation Engine (MOE)", Technical Report of IEICE, ICD98-21, CPSY98-21, FTS98-21 (Apr. 1998), pp. 77-84. (w/abstract).

Cypher, R., et al., "Architectural Requirements of Parallel Scientific Applications with Explicit Communication," Computer Architecture News, ACM, vol. 21, No. 2, New York, US, May 1, 1993, pp. 2-13.

Gibbons, R., "A Historical Application Profiler for Use by Parallel Schedulers," Proceedings of Workshop on Job Scheduling Strategies for Parallel Processing, Springer Verlag, Berlin, Germany, No. 3$^{rd}$ Conf., Apr. 5, 1997, pp. 58-77.

Shirsat, R.N., et al., "Development of a Restricted Hartree-Fock program INDMOL on PARAM: a highly parallel computer," Journal of Computational Chemistry USA, vol. 14, No. 4, Apr. 1993, pp. 445-451.

Muller, H.L., et al., "Multitasking and multithreading on a multiprocessor with virtual shared memory," High-Performance Computer Architecture, 1996. Proceedings, Second International Symposium on San Jose, CA, USA Feb. 3-7, 1996, Los Alamitos, CA, USA IEEE Comput. Soc., U.S., Feb. 3, 1996, pp. 212-221.

Chasman, D., et al., "Parallel pseudospectral electronic structure: I. Hartree-Fock calculations," Journal of Computational Chemistry Wiley USA, vol. 19, No. 9, Jul. 15, 1998, pp. 1017-1029.

Takashima, H., et al., "A novel parallel algorithm for large-scale Fock matrix construction with small locally distributed memory architectures: RT parallel algorithm," Journal of Computational Chemistry Wiley USA, vol. 23, No. 14, Nov. 15, 2002, pp. 1337-1346.

Takashima, Hajime, et al., "A Novel Algorithm for Large-Scale Fock Matrix Generation with Small Local Distributed Memory Parallel Architecture.—Relation to the Integral Cutoff," The Journal of Chemical Software, [Online] vol. 6, No. 3, Apr. 10, 2000.

* cited by examiner

FIG. 3

RT PARALLEL ALGORITHM(EMBODIMENT OF THIS INVENTION)

```
for(R=0;R<Nshell;R++){
 for(T=0;T<=R;T++){
  for(S=0;S<=R;S++){
   for(U=0;U<=R;U++){
    for(I=b_basis(R);I<=e_basis(R);I++){
     for(J=b_basis(S);J<=e_basis(S);J++){
      for(K=b_basis(T);K<=e_basis(T);K++){
       for(L=b_basis(U);L<=e_basis(U);L++){
        G_IJKL=G(I,J,K,L);
        F[I][J]+=P[K][L]*G_IJKL;
        if(L<=K&&K<I){
         if(J<I) F[K][L]+=2*P[I][J]*G_IJKL;
         else    F[K][L]+=P[I][J]*G_IJKL;
        }
        F[I][L]-=0.5*P[K][J]*G_IJKL;
        if(J<I&&K<=J)
                F[K][J]-=0.5*P[I][L]*G_IJKL;
        if(K<I&&J<=K&&L<I)
                F[K][J]-=0.5*P[I][L]*G_IJKL;
       }}}}
  }}
 }
}
```

PROCESSOR NUMBER

|         | JOB OF 0-TH QUEUE | JOB OF FIRST QUEUE | JOB OF SECOND QUEUE | JOB OF THIRD QUEUE |
|---------|-------------------|--------------------|---------------------|--------------------|
| BLOCK 0 | 0(0)              | 1(6)               | 2(4)                | 3(2)               |
| BLOCK 1 | 4(1)              | 5(7)               | 6(5)                | 7(3)               |
| BLOCK 2 | 8(2)              | 9(0)               | 10(6)               | 11(4)              |
| BLOCK 3 | 12(3)             | 13(1)              | 14(7)               | 15(5)              |
| BLOCK 4 | 16(4)             | 17(2)              | 18(0)               | 19(6)              |
| BLOCK 5 | 20(5)             | 21(3)              | 22(1)               | 23(7)              |
| BLOCK 6 | 24(6)             | 25(4)              | 26(2)               | 27(0)              |
| BLOCK 7 | 28(7)             | 29(5)              | 30(3)               | 31(1)              |
| BLOCK 8 | 32(8)             |                    |                     |                    |

| 0-TH QUEUE | FIRST QUEUE | SECOND QUEUE | THIRD QUEUE |
|---|---|---|---|
| 0(0) | 9(0) | 18(0) | 27(0) |
| 4(1) | 13(1) | 22(1) | 31(1) |
| 8(2) | 17(2) | 26(2) | 3(2) |
| 12(3) | 21(3) | 30(3) | 7(3) |
| 16(4) | 25(4) | 2(4) | 11(4) |
| 20(5) | 29(5) | 6(5) | 15(5) |
| 24(6) | 1(6) | 10(6) | 19(6) |
| 28(7) | 5(7) | 14(7) | 23(7) |
| 32(8) | | | |

FIG. 22

|  | JOB OF 0-TH QUEUE | JOB OF FIRST QUEUE | JOB OF SECOND QUEUE | JOB OF THIRD QUEUE |
|---|---|---|---|---|
| BLOCK 0 | 0(0) | 1(6) | 2(4) | 3(2) |
| BLOCK 1 | 7(1) | 6(7) | 5(5) | 4(3) |
| BLOCK 2 | 8(2) | 9(0) | 10(6) | 11(4) |
| BLOCK 3 | 15(3) | 14(1) | 13(7) | 12(5) |
| BLOCK 4 | 16(4) | 17(2) | 18(0) | 19(6) |
| BLOCK 5 | 23(5) | 22(3) | 21(1) | 20(7) |
| BLOCK 6 | 24(6) | 25(4) | 26(2) | 27(0) |
| BLOCK 7 | 31(7) | 30(5) | 29(3) | 28(1) |
| BLOCK 8 | 32(8) | | | |

FIG. 23

| 0-TH QUEUE | FIRST QUEUE | SECOND QUEUE | THIRD QUEUE |
|---|---|---|---|
| 0(0) | 9(0) | 18(0) | 27(0) |
| 7(1) | 14(1) | 21(1) | 28(1) |
| 8(2) | 17(2) | 26(2) | 3(2) |
| 15(3) | 22(3) | 29(3) | 4(3) |
| 16(4) | 25(4) | 2(4) | 11(4) |
| 23(5) | 30(5) | 5(5) | 12(5) |
| 24(6) | 1(6) | 10(6) | 19(6) |
| 31(7) | 6(7) | 13(7) | 20(7) |
| 32(8) | | | |

FIG. 27

| | JOB OF 0-TH QUEUE | JOB OF FIRST QUEUE | JOB OF SECOND QUEUE | JOB OF THIRD QUEUE |
|---|---|---|---|---|
| BLOCK 0 | 0(0) | 1(12) | 2(8) | 3(4) |
| BLOCK 1 | 4(3) | 5(14) | 6(10) | 7(6) |
| BLOCK 2 | 8(5) | 9(0) | 10(12) | 11(8) |
| BLOCK 3 | 12(7) | 13(2) | 14(14) | 15(10) |
| BLOCK 4 | 16(9) | 17(4) | 18(0) | 19(12) |
| BLOCK 5 | 20(11) | 21(6) | 22(2) | 23(14) |
| BLOCK 6 | 24(13) | 25(8) | 26(4) | 27(0) |
| BLOCK 7 | 28(15) | 29(10) | 30(6) | 31(2) |
| BLOCK 8 | 32(1) | 33(13) | 34(9) | 35(5) |
| BLOCK 9 | 36(4) | 37(15) | 38(11) | 39(7) |
| BLOCK 10 | 40(6) | 41(1) | 42(13) | 43(9) |
| BLOCK 11 | 44(8) | 45(3) | 46(15) | 47(11) |
| BLOCK 12 | 48(10) | 49(5) | 50(1) | 51(13) |
| BLOCK 13 | 52(12) | 53(7) | 54(3) | 55(15) |
| BLOCK 14 | 56(14) | 57(9) | 58(5) | 59(1) |
| BLOCK 15 | 60(16) | 61(11) | 62(7) | 63(3) |
| BLOCK 16 | 64(2) | | | |

FIG. 28

| 0-TH QUEUE | FIRST QUEUE | SECOND QUEUE | THIRD QUEUE |
|---|---|---|---|
| 0(0) | 9(0) | 18(0) | 27(0) |
| 32(1) | 41(1) | 50(1) | 59(1) |
| 64(2) | 13(2) | 22(2) | 31(2) |
| 4(3) | 45(3) | 54(3) | 63(3) |
| 36(4) | 17(4) | 26(4) | 3(4) |
| 8(5) | 49(5) | 58(5) | 35(5) |
| 40(6) | 21(6) | 30(6) | 7(6) |
| 12(7) | 53(7) | 62(7) | 39(7) |
| 44(8) | 25(8) | 2(8) | 11(8) |
| 16(9) | 57(9) | 34(9) | 43(9) |
| 48(10) | 29(10) | 6(10) | 15(10) |
| 20(11) | 61(11) | 38(11) | 47(11) |
| 52(12) | 1(12) | 10(12) | 19(12) |
| 24(13) | 33(13) | 42(13) | 51(13) |
| 56(14) | 5(14) | 14(14) | 23(14) |
| 28(15) | 37(15) | 46(15) | 55(15) |
| 60(16) | | | |

TABLE 1 ; ANGULAR MOMENTUMS, ORBITAL INDEXES, ATOMIC NUCLEUS COORDINATES OF PRIMITIVE BASIC FUNCTION

| NUMBER OF PRIMITIVE BASIC FUNCTION | ANGULAR MOMENTUM | ORBITAL INDEX | ATOMIC NUCLEUS COORDINATES |
|---|---|---|---|
| i | a | $\zeta_a$ | A |
| j | b | $\zeta_b$ | B |
| k | c | $\zeta_c$ | C |
| l | d | $\zeta_d$ | D |

FIG. 33

(FORMULA 1)

$$\phi_\mu = \sum_I \chi_I C_{I\mu}$$

(FORMULA 2)

$$\Psi(1, 2, \cdots, 2n) = \frac{1}{\sqrt{(2n)!}} \times$$

$$\begin{vmatrix} \phi_1\alpha(1) & \phi_1\beta(1) & \phi_2\alpha(1) & \phi_2\beta(1) & \cdots & \phi_n\alpha(1) & \phi_n\beta(1) \\ \phi_1\alpha(2) & \phi_1\beta(2) & \phi_2\alpha(2) & \phi_2\beta(2) & \cdots & \phi_n\alpha(2) & \phi_n\beta(2) \\ \vdots & \vdots & \vdots & \vdots & \vdots & \vdots & \vdots \\ \phi_1\alpha(2n) & \phi_1\beta(2n) & \phi_2\alpha(2n) & \phi_2\beta(2n) & \cdots & \phi_n\alpha(2n) & \phi_n\beta(2n) \end{vmatrix}$$

(FORMULA 3)

$$H = H_1 + H_2$$

(FORMULA 4)

$$H_1 = \sum_p \left[ -\frac{1}{2} \nabla_p^2 - \sum_A \frac{Z_A}{r_{pA}} \right]$$

(FORMULA 5)

$$H_2 = \sum_p \sum_{q(>p)} \frac{1}{r_{pq}}$$

FIG. 34

(FORMULA 6)

$$\varepsilon = \int \Psi H \Psi \, d\tau = \int \Psi (H_1 + H_2) \Psi \, d\tau$$

$$= 2 \sum_\mu H_\mu + \sum_\mu \sum_\nu (2 J_{\mu\nu} - K_{\mu\nu})$$

(FORMULA 7)

$$H_\mu = \int \phi_\mu(1) h^{core}(1) \phi_\mu(1) \, d\tau_1$$

(FORMULA 8)

$$J_{\mu\nu} = \int\int \phi_\mu(1) \phi_\mu(1) \frac{1}{r_{12}} \phi_\nu(2) \phi_\nu(2) \, d\tau_1 d\tau_2$$

(FORMULA 9)

$$K_{\mu\nu} = \int\int \phi_\mu(1) \phi_\nu(1) \frac{1}{r_{12}} \phi_\mu(2) \phi_\nu(2) \, d\tau_1 d\tau_2$$

FIG. 35

(FORMULA 10)

$$\varepsilon = 2\sum_{\mu}\left[\sum_{I}\sum_{J} C_{I\mu} C_{J\mu} H_{IJ}\right]$$
$$+\sum_{\mu}\sum_{\nu}\left\{\sum_{I}\sum_{J}\sum_{K}\sum_{L} C_{I\mu} C_{J\mu} C_{K\nu} C_{L\nu}[2G(I,J,K,L)-G(I,K,J,L)]\right\}$$

(FORMULA 11)

$$H_{IJ} = \int \chi_I(1) h^{core}(1) \chi_J(1) d\tau_1$$

(FORMULA 12)

$$h^{core}(1) = -\frac{1}{2}\nabla_1^2 - \sum_A \frac{Z_A}{r_{1A}}$$

(FORMULA 13)

$$G(I,J,K,L) = \int\int \chi_I(1) \chi_J(1) \frac{1}{r_{12}} \chi_K(2) \chi_L(2) d\tau_1 d\tau_2$$

FIG. 36

(FORMULA 14)

$$\sum_J (F_{IJ} - \varepsilon_\mu S_{IJ}) C_{J\mu} = 0$$

(FORMULA 15)

$$F_{IJ} = H_{IJ} + \sum_K \sum_L P_{KL}\left[G(I,J,K,L) - \frac{1}{2}G(I,K,J,L)\right]$$

(FORMULA 16)

$$\varepsilon_\mu = H_\mu + \sum_\nu (2J_{\mu\nu} - K_{\mu\nu})$$

(FORMULA 17)

$$S_{IJ} = \int \chi_I(1)\chi_J(1)\,d\tau_1$$

(FORMULA 18)

$$P_{KL} = 2\sum_\nu C_{K\nu}C_{L\nu}$$

(FORMULA 19)

(FORMULA 20)

$$\chi(r, n, R) = (r_x - R_x)^{n_x} (r_y - R_y)^{n_y} (r_z - R_z)^{n_z}$$
$$\times \sum_m d_m \exp\left[-\zeta_m (r-R)^2\right]$$

(FORMULA 21)

$$\phi(r, n, R)$$
$$= (r_x - R_x)^{n_x} (r_y - R_y)^{n_y} (r_z - R_z)^{n_z} \exp\left[-\zeta (r-R)^2\right]$$

(FORMULA 22)

$$\sum_m d_m \exp\left[-\zeta_m (r-R)^2\right]$$

(FORMULA 23)

$$G(I, J, K, L) = \sum_{m1} \sum_{m2} \sum_{m3} \sum_{m4} d_{m1} d_{m2} d_{m3} d_{m4} g(i, j, k, l)$$

(FORMULA 24)

$$g(i, j, k, l) = \int \int \phi_i(1) \phi_j(1) \frac{1}{r_{12}} \phi_k(2) \phi_l(2) \, d\tau_1 \, d\tau_2$$

(FORMULA 25)

(FORMULA 26)

$$[0_a 0_b, 0_c 0_d]^{(m)} = \frac{1}{\sqrt{\zeta+\eta}} \cdot K(\zeta_a, \zeta_b, A, B) \cdot K(\zeta_c, \zeta_d, C, D) \cdot F_m(T)$$

(FORMULA 27)

$$F_m(T) = \int t^{2m} \exp(-T t^2) dt$$

(FORMULA 28)

$$T = \rho (P-Q)^2$$

(FORMULA 29)

$$K(\zeta, \zeta', R, R') = \sqrt{2} \frac{\pi^{5/4}}{\zeta+\zeta'} \exp\left[-\frac{\zeta \zeta' (R-R')^2}{\zeta+\zeta'}\right]$$

(FORMULA 30)

$$\zeta = \zeta_a + \zeta_b$$

(FORMULA 31)

$$\eta = \zeta_c + \zeta_d$$

(FORMULA 32)

$$\rho = \frac{\zeta \eta}{\zeta + \eta}$$

(FORMULA 33)

$$P = \frac{\zeta_a A + \zeta_b B}{\zeta_a + \zeta_b}$$

(FORMULA 34)

$$Q = \frac{\zeta_c C + \zeta_d D}{\zeta_c + \zeta_d}$$

FIG. 39

(FORMULA 35)

$$[(a+1_i)b, cd]^{(m)}$$
$$= (P_i - A_i)[ab, cd]^{(m)} + (W_i - P_i)[ab, cd]^{(m+1)}$$
$$+ \frac{N_i(a)}{2\zeta}\left\{[(a-1_i)b, cd]^{(m)} - \frac{\rho}{\zeta}[(a-1_i)b, cd]^{(m+1)}\right\}$$
$$+ \frac{N_i(b)}{2\zeta}\left\{[a(b-1_i), cd]^{(m)} - \frac{\rho}{\zeta}[a(b-1_i), cd]^{(m+1)}\right\}$$
$$+ \frac{N_i(c)}{(\zeta+\eta)}[ab, (c-1_i)d]^{(m+1)}$$
$$+ \frac{N_i(d)}{(\zeta+\eta)}[ab, c(d-1_i)]^{(m+1)}$$

(FORMULA 36)

$$W = \frac{\zeta P + \eta Q}{\zeta + \eta}$$

(FORMULA 37)

$$\exp = \left[-\frac{\zeta\zeta'(R-R')^2}{\zeta+\zeta'}\right]$$

(FORMULA 38)

$$\frac{R(R+1)}{2} + T$$

METHOD FOR ASSIGNING JOB IN PARALLEL PROCESSING METHOD AND PARALLEL PROCESSING METHOD

TECHNICAL FIELD

The present invention relates to a job assignment method in a parallel processing method for parallelly processing a plurality of jobs by a plurality of processors in a computer system comprising a host computer and a plurality of processors connected to the host computer through a common bus. The present invention also relates to a parallel processing method for processing large-scale matrix element calculation having specific symmetry, in particular, Fock matrix element calculation at high speed in molecular simulation using ab initio molecular orbital method.

BACKGROUND ART

In the field of chemistry, molecular orbital method, molecular dynamics method, Monte Carlo method and the like are available as methods for analyzing states and behaviors of molecules numerically. Of these methods, the ab initio molecular orbital calculation method intends to describe behaviors of electrons in molecule in quantum mechanics based upon the first principle. Therefore, this method is evaluated as a base of molecular simulation and is considered as an important method that is useful for analyzing material structures and chemical reactions in detail from an industry standpoint.

In the ab initio molecular orbital calculation, one or a plurality of basis functions are prepared for single atom. These basis functions are represented as reciprocal numbers of exponential functions whose exponential factor is defined as multiplying empirical constants with square of distance between atomic nucleus and orbital electrons comprising molecule. The linear combination of these basis functions may describe wave functions within molecule, i.e. molecular orbital.

A major processing in an ab initio molecular orbital calculation method is to determine linear combination coefficients of basis functions in the molecular orbital. Such calculation needs a calculation amount and a storage capacity proportional to biquadrate of number of basis functions. Accordingly, at present, the ab initio molecular orbital calculation method is applied to only molecular systems of a scale of approximately 100 atoms at best. Development of calculation systems specially designed for the ab initio molecular orbital calculations and which will be useful as application to molecule systems of scale of several 1000 s of atoms is indispensable for realizing molecular solution of life process/chemical development more clearly.

As examples of calculation systems specially designed for the ab initio molecular orbital calculations of large scale, there are known systems that had been described in a literature 1 ("The Architecture of a Molecular Orbital Calculation Engine (MOE)", written by Shirakawa et. al. in Technical Reports of the Institute of Electronics, Information and Communication Engineers, Vol. CPSY96-46, No. 5, pp. 45-50, 1996) or a literature 2 ("PPRAM-MOE:A Processing Node LSI of the Molecular Orbital Calculation Engine (MOE)" written by Inabata et. al. in Technical Reports of the Institute of Electronics, Information and Communication Engineers, Vol. CPSY98-21, No. 4, pp. 77-84, 1998).

The calculation systems described in these literatures are parallel processing systems comprising a host computer and 100 processors (in the following descriptions, processor for use in parallel processing will be referred to as a "processor element") connected to the host computer through a common bus and intend to execute the ab initio molecular orbital calculation at high speed, for example.

Because these systems include parallel processor elements that are high in processor capabilities and the whole system can be realized by low costs, it is possible to provide calculation systems that are excellent in cost performance.

When a calculation amount is vehement as in ab initio molecular orbital calculation, it is important that ab initio molecular orbital calculation can be made at higher speed by using a plurality of processor elements for use in parallel processing efficiently. In particular, in the systems that had been described in the above-described literatures, since the respective processor elements communicate with the host computer through the common bus and execute calculations while they are transmitting and receiving necessary data between them and the host computer, to make processing become efficient by reducing a communication standby time in the respective processor elements as much as possible is important for realizing high-speed processing.

However, when jobs are formed and assigned to parallel processor elements with respect to the ab initio molecular orbital calculation simply, since calculation amount (calculation time and traffic) differs at every job, communication overhead (standby time) is produced. There then arises a problem that improvements of throughput proportional to the number of processor elements cannot be obtained.

As the number of processor elements for use in parallel processing increases, a total amount of data transmitted and received between the host computer and the processor elements is not changed but throughputs of the processor elements increase in proportion to the number of the processor elements. As a consequence, traffic that should be made within a constant time (average communication time) increases. If the number of the processor elements increases in excess of a certain number, then the average traffic will exceed throughput of a communication network (communication performance). This is one of the causes to produce communication overhead.

When communication load is unequally produced, from a time standpoint, such that communication requests concentrate within a short time and a total traffic exceeds communication performance of communication network temporarily, communication overhead is produced, which as a result causes parallel efficiency to be degraded. This trouble occurs when average traffic is not beyond communication performance of communication network as well.

To decrease resultant total traffics and to make occurrence of communication load become uniform from a time standpoint (distribution of communication load from a time standpoint) are indispensable for making efficient processing in a parallel computer.

If a plurality of jobs is those in which calculation amount (calculation time: this calculation contains conversion processing using ROM (Read Only Memory). In this specification, calculation and operation are used as synonyms) and traffic (communication time) are equal, parallel processing can be made by assigning jobs to the respective processor elements without producing communication overhead.

A literature 3 (official gazette of Japanese laid-open patent application No. 5-324581) describes a load distribution method for making calculation load become uniform when calculation of many-body problem is processed in a parallel processing fashion. The load distribution method that had been described in the literature 3 assumes that sizes of respective jobs are all equal. Accordingly, calculation loads are made equal by making the number of jobs assigned to processor elements become equal.

In the ab initio molecular orbital calculation, however, the number of calculation loops differs at every job and traffic provided by difference of data amounts obtained from the host computer is also different. There then arises a problem that calculation loads cannot be made equal only by making the number of jobs become equal.

In addition to the above-described literatures, a literature 4 (official gazette of Japanese laid-open patent application No. 6-35870), a literature 5 (official gazette of Japanese laid-open patent application No. 6-243112), a literature 6 (official gazette of Japanese laid-open patent application No. 7-295942), a literature 8 (official gazette of Japanese laid-open patent application No. 8-185377) and a literature 9 (official gazette of Japanese laid-open patent application No. 10-240698) had disclosed load distribution methods required when a plurality of processor elements make parallel processing).

Since the load distribution methods that had been described in these literatures 4, 5, 6, 7 and 9, however, have measured or estimated the load states of the processor elements and execute scheduling of jobs, they need functions specially prepared for measuring or estimating the load states of the processor elements and also need additional processing for measuring or estimating the load states of the processor elements.

Moreover, although the distribution calculation system that had been described in the literature 8 discloses processing in which a distribution system is separated into groups having equal capability and load distribution is made at the unit of groups, since distribution of communication load is not considered, there arises a problem that communication overhead increases unavoidably.

In view of the aforesaid aspect, it is an object of the present invention to provide a job assignment method in which a specially-designed mechanism need not be provided and loads can be made equal by a simple method even when calculation loads and communication loads differ at every job and in which efficient parallel processing is made possible and processing time of the whole system can be reduced.

DISCLOSURE OF INVENTION

In a parallel processing method in which a plurality of jobs comprising communication processing between a host computer and a plurality of processors and calculation processing in the processors are parallelly processed by a plurality of processors in a computer host system a comprising a host computer and a plurality of processors connected to the host computer through a common bus, a job assignment method in a parallel processing method according to the first invention is characterized in that respective jobs are assigned to the respective processors in such a manner that an average value of ratios between communication times and calculation times of the jobs falls within a predetermined value.

According to the first invention having the above-mentioned arrangement, since the jobs are assigned to a plurality of processors such that the average value of the ratios between the communication times and the calculation times of the jobs falls within the predetermined value, communication processing and calculation processing can be executed efficiently and a time up to the end of processing can decrease.

In the job assignment method in the parallel processing method of the first invention, the second invention is characterized in that when a whole communication time of a plurality of jobs and a total amount of calculation times of one job required to assign a plurality of jobs to a plurality of processors equally are nearly equal, respective jobs are assigned to the processors such that an average value of ratios between communication times and calculation times of the jobs becomes equal to 1/(the number of the processors).

According to the second invention, since the average value of the ratios between the communication times and the calculation times of jobs becomes equal to 1/(the number of the processors) when the whole communication times of a plurality of jobs and the total amount of the calculation times of one job required to equally assign a plurality of jobs to a plurality of processors are nearly equal, a time zone in which neither communication nor calculation is carried out in each processor is not produced, and the processing is ended when the above-mentioned calculation time is ended in each of a plurality of parallel processors. Therefore, both of communication processing and calculation processing can be executed efficiently and the time up to the end of processing can be reduced.

In the job assignment method in the parallel processing method according to the first invention, the third invention is characterized in that jobs in which the ratios between the communication times and the calculation times are larger than the predetermined value or 1/(the number of the processors) and jobs in which the ratios between the communication times and the calculation times are smaller than the predetermined value or 1/(the number of the processors) are alternately assigned to respective processors.

In the job assignment method in the parallel processing method according to the second invention, the fourth invention is characterized in that jobs in which the ratios between the communications time and the calculation times are larger than the predetermined value or 1/(the number of the processors) and jobs in which the ratios between the communication times and the calculation times are smaller than the predetermined value or 1/(the number of the processors) are alternately assigned to respective processors.

According to the third invention and the fourth invention, the communication processing and the calculation processing can be executed efficiently by the simple method in which the jobs in which the ratios between the communication times and the calculation times are larger than the predetermined value or 1/(the number of the processors) and the jobs in which the ratios between the communication times and the calculation times are smaller than the predetermined value or 1/(the number of the processors) are assigned to the respective processors.

In a parallel processing method for parallelly processing a plurality of jobs comprising communication processing between a host computer and a plurality of processors and calculation processing in the processors by a plurality of processors in a computer system comprising the host computer and a plurality of processors connected to the host computer through a common bus, the fifth invention is characterized in that a plurality of jobs are numbered by integers continuing from N (N is integer) to M (M is integer larger than N), a job that is numbered as N+(M−J−1) is assigned to the processor as the next job if the number J of the job that has been assigned just before is not greater than (N+M)/2 and a job that is numbered as N+(M−J) is assigned to the processor as the next job if the number J of the job that has been assigned just before is greater than (N+M)/2, otherwise a job that is numbered as N+(M−J) is assigned to the processor as the next job if the number J of the job that has been assigned just before is less than (N+M)/2 and a job that is numbered as N+(M−J−1) is assigned to the processor as the next job if the number J of the job that has been assigned just before is not less than (N+M)/2 and respective jobs are assigned to processors in such a manner that an average value of ratios between the communication times and the calculation times falls within a predetermined value.

In the fifth invention, the jobs are numbered by integers continuing from N (N is integer) to M (integer greater than N) in the sequential order of the smaller ratios between the communication times and the calculation times or in the sequential order of the larger ratios between the communication times and the calculation times. The sizes of a plurality of jobs can be prevented from being fluctuated substantially.

When the job number of the pre-processing in the processor is greater than an intermediate value of the whole job numbers, the job of the smaller job number is assigned to the processor as the next job. When the job number of the pre-processing is smaller than the intermediate value of the whole job numbers, the job of the larger job number is assigned to the processor as the next job.

Therefore, the average value of ratios between the communication times and the calculation times of the jobs becomes nearly equal to the reciprocal of several ones of the processors, the communication processing and the calculation processing can be carried out efficiently and the time up to the end of processing can be reduced.

In a parallel processing method for parallelly processing a plurality of jobs comprising communication processing between a host computer and processors and calculation processing by a plurality of processors in a computer system comprising the host computer and a plurality of processors connected to the host computer through a common bus, the sixth invention is characterized in that a plurality of processors are divided into G (G is integer not less than 2) processor groups in which the numbers of the processors is equal within the each group, a plurality of jobs is divided into G job groups in which the numbers of the jobs is equal within the each group, the processor groups and the job groups are associated with each other in a one-to-one relation, jobs within one job group are assigned to processors within corresponding one processor group, jobs in which the size comprising the communication time and the calculation time and the ratios between the communication times and the calculation times are approximate to each other belong to different job groups of the job groups and jobs in which sizes comprising the communication time and the calculation time and the ratio between the communication time and the calculation time are approximate to each other are assigned to processors in such a manner that assignment order of said jobs within the job groups differ from each other within the plurality of job groups.

In the sixth invention, a plurality of processors is divided into G (G is integer not less than 2) processor groups in which the numbers of processors within the groups are nearly equal. A plurality of jobs is divided into G job groups in which the number of the jobs within the groups is equal to the number of the processor groups. Processor groups and job groups are associated with each other in a one-to-one relation and the job within one job group is assigned to the processor within corresponding one processor group.

In this case, jobs in which sizes comprising communication times and calculation times and communication times and calculation times are approximate to each other are dispersed so as to belong to different job groups. In addition, assignment orders of the jobs in which the sizes comprising the communication times and the calculation times and the communication times and the calculation times are approximate to each other in the job groups are dispersed so as to become different from each other so that communication processing executed by a plurality of jobs can be prevented from being placed in the congestion state on the common bus.

Therefore, the communication processing and the calculation processing can be carried out efficiently, whereby a time up to the end of processing can be reduced.

According to the seventh invention, there is provided a parallel processing method in which molecular orbital calculation for calculating energy of molecule expressed by n (n is a positive integer) contracted shells is executed by a computer system comprising a host computer and a plurality of processors, with respect to all matrix elements F(I, J) of Fock matrix F expressed in the form of a sum concerning all of primitive basis functions contained in contracted basis functions I, J composed of primitive basis functions i, j in a calculation of a sum f(I, J)=f1(I, J)+f2(I, J), an outermost loop is selected as a loop concerning a combination of the contracted shell R and T which can satisfy relationships of R$\leq$n max (n max represents the maximum value of numbers assigned to n contracted shells) and T$\leq$R, a second loop in the inside of the outermost loop is selected as a loop concerning the contracted shell S, a third loop in the inside of the second loop is selected as a loop concerning the contracted shell U, or the second loop is selected as a loop concerning the contracted shell U and the third loop is selected as a loop concerning the contracted shell S, a range of values which the contracted shell S can take is selected to be not greater than R, a range of values which the contracted shell U can take is selected to be not greater than R, a predetermined two-electron integral and a part of a predetermined Fock matrix element using the result of the predetermined two-electron integral are calculated at the inside of the third loop, the second and third loops are collected as one job unit and processing is assigned to the processor at the job unit, a parallel processing method characterized in that the jobs are formed in such a manner that a low number is assigned to a job whose orbital quantum number of the contracted shell R is large and a high number is assigned to a job whose orbital quantum number of said contracted shell R is small, wherein f1(I, J) represents the sum concerning all contracted basis functions of products A1·P(K, L)·g(i, j, k, l) with a coefficient A1;

f2(i, j) represents the sum concerning all contracted basis functions of a product A2·P(K, L)·g(i, k, j, l) with a coefficient A2, g(i, j, k, l) represents the function value of a two-electron integral function g expressed by using primitive basis functions i, j, k, l which are components of primitive shells r, s, t, u contained in contracted shell R, D, T, U as indexes; and P(K, L) represents the element of density matrix P expressed by using a contracted basis function K composed of the primitive basis function k and a contracted basis function L composed of the primitive basis function l as indexes.

The seventh invention is the parallel processing method is the parallel processing method in which Fock matrix based upon the Fock matrix calculation algorithm in ab initio molecular orbital calculation can be calculated at high speed without being rate-limited by a communication performance between a host computer and processor elements and a processing performance of the host computer.

In this case, loops concerning the contracted shells R and T are controlled by the host computer and portions of loops concerning S and U in which a combination of R and T is fixed are assigned to the processor elements.

Since the relationship of R≧T, S, U is satisfied, the contracted shell R having high number performs large number of loops. On the other hand, the contracted shell having low number performs lesser number of loops. Moreover, the shell whose orbital quantum number is large needs a large number of density matrix elements necessary for calculation so that traffic increases. The shell whose orbital quantum number is small needs lesser density matrix elements so that traffic decreases.

Accordingly, when the small job number is assigned to the job in which the orbital quantum number of the contracted shell R is large and the high job number is assigned to the job in which the orbital quantum number of the contracted shell R is small as in the seventh invention, fluctuations of job size composed of a calculation processing and a communication processing can decrease.

Therefore, jobs can be efficiently assigned to a plurality of processor elements for parallel processing.

Accordingly, in the parallel processing method of the molecular orbital calculation according to the seventh invention, the jobs care assigned to a plurality of processors by using any one of job assignment methods of the aforementioned first invention, the second invention, the third invention, the fourth invention and the fifth invention, whereby both of the communication processing and the calculation processing can be efficiently carried out and a time required up to the end of processing can be reduced.

BRIEF DESCRIPTION OF DRAWINGS

FIG. 3 is a diagram showing an RT parallel algorithm according to an embodiment of the present invention in the form of a program code.

FIG. 22 is a diagram to which reference will be made in explaining a job group dividing method and a job assignment method according to the third embodiment of the present invention.

FIG. 23 is a diagram showing examples of queue matrixes that are used to assign jobs to processor elements according to a fourth embodiment of the present invention.

FIG. 27 is a diagram to which reference will be made in explaining a job group dividing method and a job assignment method according to a fifth embodiment of the present invention.

FIG. 28 is a diagram showing examples of queue matrixes that are used to assign jobs to processor elements according to the fifth embodiment of the present invention.

FIGS. 33 to 39 are diagrams showing formulas that are used to explain an ab initio molecular orbital calculation method.

BEST MODE FOR CARRYING OUT THE INVENTION

Figure 1:
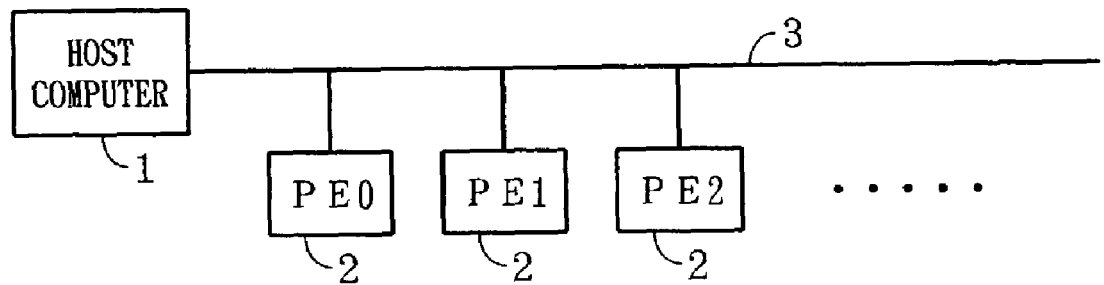
FIG. 1 is a block diagram showing an example of a computer system that is used in embodiments of the present invention.

Embodiments in which a parallel processing method and its job assignment method according to the present invention are applied to a Fock matrix calculation algorithm in an ab initio molecular orbital calculation method will be described below with reference to the drawings.

Prior to descriptions of a parallel processing method and its job assignment method according to the present invention, ab initio molecular orbital method, examples of arrangements of computer system used therefore and a novel Fock matrix calculation algorithm in the ab initio molecular orbital method will be described.

[Outline of Ab Initio Molecular Orbital Method]

In the ab initio molecular orbital calculation method, wave function $\Psi$ expressing the state of molecule is described by electron orbital function $\phi_\mu$ corresponding to spatial orbital of electrons in the molecule where $\mu$ is a suffix expressing $\mu$-th molecular orbital in a plurality of molecular orbitals. The molecular orbital $\phi_\mu$ is a linear combination of atomic orbital $\chi_I$ and is approximately expressed as (formula 1) of FIG. 33.

In (formula 1), I is a suffix expressing I-th atomic orbital in a plurality of atomic orbitals. The atomic orbital is often referred to as a "basis function". $C_{I\mu}$ in (formula 1) represents a linear combination coefficient. A total sum concerning I in (formula 1) concerns all basis functions comprising molecules to be calculated.

In order to describe a molecular orbital from a quantum mechanics standpoint, a well-known Pauli exclusion principle should be satisfied in the state of electrons within molecule. Slater determinant expressed in (formula 2) of FIG. 33 is expressed as a formula for describing the state $\Psi$ of molecule of 2n electrons system so as to satisfy Pauli exclusion principle taking spin of electrons into consideration. In (formula 2), $\alpha(x)$ and $\beta(x)$ represent the states in which x-th electron spins upwardly and downwardly.

Hamiltonian H relative to the 2n electrons system is written in the form of a sum of 1-electron portion H1 and two-electron portion H2 from (formula 3) to (formula 5) in FIG. 33.

In (formula 4) of FIG. 33, the first term within ( . . . ) of the right-hand member represents kinetic energy of electron p and the second term represents interaction of p-th electron and A-th atomic nucleus. In (formula 4), $\Sigma_p$ (in this specification, $\Sigma_i$ expresses a total sum of I and this relationship applies for other descriptions of this specification as well) represents a total sum of all electrons, $\Sigma_A$ represents a total sum concerning all atomic nucleuses, $Z_A$ represents electric charge of atomic nucleus A and $r_{pA}$ represents a distance between the electron p and the atomic nucleus A.

(formula 5) expresses interaction between the electron p and the electron q, $\Sigma_p\Sigma_{q(>p)}$ represents a total sum of combinations of two electrons and $r_{pq}$ represents a distance between the electrons p and q.

Using Hamiltonian H and the Slater determinant of (formula 2), expectation value $\epsilon$ of molecular energy is expressed as (formula 6) to (formula 9) of FIG. 34.

In (formula 6), $\Sigma_\mu$ and $\Sigma_\nu$ represent total sums concerning n (n is a positive integer) molecular orbital. (formula 7) is referred to as a "core integral" and is representatively written with respect to electron of number 1. (formula 8) and (formula 9) are respectively referred to as a "Coulomb integral" and a "exchange integral" and are representatively written with respect to electrons 1 and 2. $d\tau$, $d\tau1$, $d\tau2$ express volume integrals in the position coordinate space.

Rewriting (formula 6) by basis function, we have integrals expressed by (formula 10) to (formula 13) shown in FIG. 35. The integral expressed by (formula 13) is referred to as a "two-electron repulsion integral" or referred to as a "two-electron integral" for simplicity.

The expectation value $\epsilon$ of molecular energy expressed by (formula 10) contains unknown $C_{I\mu}$ and cannot obtain a numerical value directly by this equation. $C_{I\mu}$ in (formula 1) represents a linear combination coefficient. "$\mu$" is an integer from 1 to n (n is the number of the molecular orbital) and "I" is an integer from 1 to N (N is the number of the basis functions and a positive integer). In the following description, N×n matrix C having an element $C_{I\mu}$ is referred to as a "coefficient matrix".

A calculus of variation of Hartree-Fock-Roothaan (hereinafter referred to as a "HFR method" for simplicity) is used as one of the methods of determining a coefficient matrix so that the expectation value $\epsilon$ may be minimized to calculate the wave function $\Psi$ of the ground state. Processes for introducing formulas are not shown and formulas obtained as results of HFR method are expressed in (formula 14) to (formula 18) of FIG. 38.

$F_{IJ}$ is called a Fock matrix element and $P_{KL}$ is called a density matrix element, respectively. In the following description, these elements are often expressed as F(I, J), P(K, L). These elements have numerical values relative to I, J, K, L having values ranging from 1 to N and are respectively expressed in the form of N×N matrix.

A coefficient matrix is obtained by solving (formula 14). (formula 14) exists relative to all $\mu$ ranging from 1 to n and to all I ranging from 1 to N. (formula 14) is comprising of n×N simultaneous equations.

Calculation of the coefficient matrix C that was obtained by solving (formula 14) uses the density matrix P. The density matrix P is calculated from the coefficient matrix C as is expressed by (formula 18). The practical calculation procedure will be described. First, the coefficient matrix C is given properly and the Fock matrix F is calculated by using the density matrix P that has been calculated by the proper coefficient matrix according to (formula 15), and a new coefficient matrix C is obtained by solving the simultaneous equations of (formula 14). The above-mentioned calculation is repeated until a difference between C which is the origin of the density matrix P and the resultant C becomes sufficiently small, i.e. self-consistent field. This repetitive calculation will be referred to as a "self-consistent field calculation (hereinafter referred to as a "SCF calculation").

In actual calculations, calculation of Fock matrix element $F_{IJ}$ of (formula 15) needs most plenty of time. The reason for this is that (formula 15) should be calculated on all I and J and that the sums concerning K, L of the density matrix element $P_{KL}$ should be calculated relative to combinations of respective I and J.

There are two methods for SCF calculation. One method is referred to as a "disk storage SCF method" in which two-electron integral values obtained by the first SCF calculation are all stored in a disk and necessary two-electron integral is read out from the disk after the second time. Another method is referred to as a "direct SCF method" in which calculation of two-electron integral is made over again each time SCF calculation is made.

At present, because of the limit of a disk storage capacity and a time period of access time, the latter direct SCF method is widely spreading as the mainstream method. In the molecular orbital calculation based upon this direct SCF method, since two-electron integral should be calculated substantially $N^4$ times per SCF calculation, high-speed two-electron integral calculation is directly connected with high-speed molecular orbital calculation.

Symmetries of two-electron integral G(I, J, K, L), density matrix P(K, L) and Fock matrix F(I, J) will be described herein.

Figure 26:
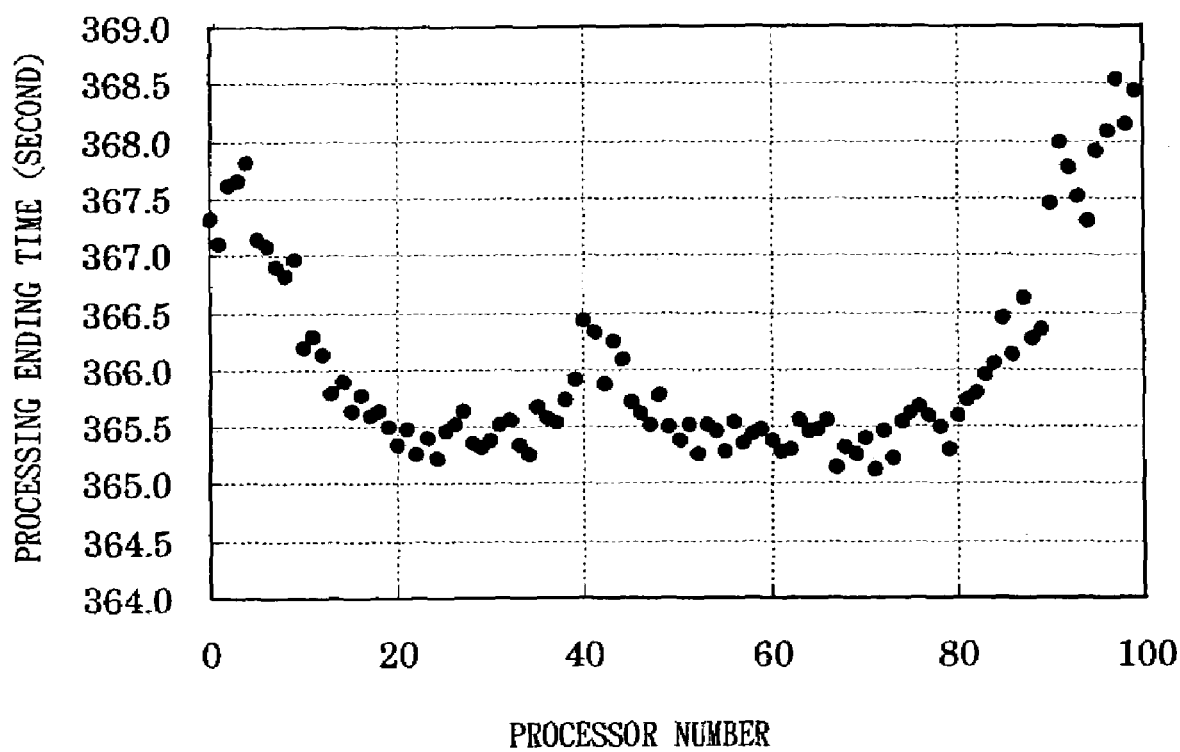
FIG. 26 is a diagram showing processing ending times of individual parallel processors according to the fourth embodiment of the present invention.

As is clear from (formula 13), the two-electron integral has the symmetry shown in (formula 19) of FIG. 26. Therefore, if a numerical value of one of (formula 19) is obtained, then numerical values of other remaining seven items can be obtained.

Figure 25:
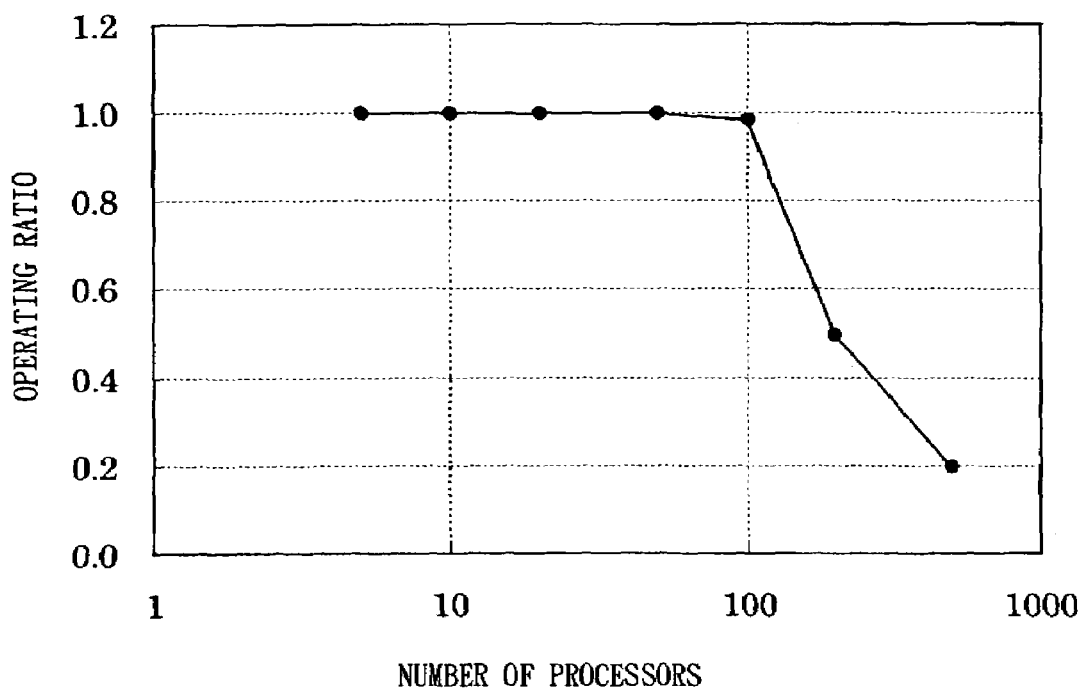
FIG. 25 is a diagram showing a relationship between the number of parallel processors and the operating ratio of processors according to the fourth embodiment of the present invention.

From (formula 18) of FIG. 36, it is to be understood that P(K, L)=P(L, K), and from (formula 15) of FIG. 26 and (formula 11) of FIG. 25, it is to be understood that F(I, J)=F(J, I).

[Contracted Basis Function and Primitive Basis Function]

In the ab initio molecular orbital method, there is generally used a basis function shown in (formula 20) of FIG. 37. In (formula 20), r, n, R denote vectors and components with suffixes x, y, z denote their components. Reference letter r denotes electron coordinate, n denotes electron angular momentum and R denotes atomic nucleus coordinate.

$n_x+n_y+n_z=\lambda$ denotes magnitude of angular momentum and is also referred to as a "orbital quantum number". When this orbital quantum number $\lambda$ is 0, the orbital is referred to as a "s orbital". When the orbital quantum number is 1, the orbital is referred to as a "p orbital". When the orbital quantum number is 2, the orbital is referred to as a "d orbital".

$\zeta_m$ denotes an orbital exponent which indicates a degree in which orbital is spread spatially. It is frequently observed that one basis function is expressed by a linear combination of a plurality of orbitals having different orbital exponents. The basis function thus expressed is called a "contracted basis function", and linear combination coefficient $d_m$ is called a "contraction coefficient". On the other hand, a function $\psi$, which is before being linearly combined, and which is in the form of (formula 21) of FIG. 37 is referred to as a "primitive basis function".

It is customary that the contracted basis function $\chi$ is numbered with capital letters like I, J, K, L and that the primitive basis function $\psi$ is numbered with small letters like i, j, k, l. This relationship applies for this specification as well.

[Contracted Shell and Primitive Shell]

When the orbital quantum number is 1, there are obtained three contracted basis functions of n=(1, 0, 0), n=(0, 1, 0) and n=(0, 0, 1). Similarly, when the orbital quantum number is 2, there exist six contracted basis functions (or five contracted basis functions depending upon the manner in which the basis function is made).

A set of a plurality of contracted basis functions in which portions shown by (formula 22) of FIG. 37 of (formula 20) are common is referred to as a "contracted shell". A contracted shell of p orbital comprises three contracted basis functions, and a contracted shell of d orbital comprises six (or five) contracted basis functions. In the case of s orbital, a set of one contracted basis function will be referred to as a "contracted shell" for the sake of convenience.

A set of primitive basis functions in which portions of exp $[-\zeta(r-R)^2]$ of (formula 21) are common will be similarly referred to as a "primitive shell". It is customary that contracted shells are numbered with capital letters like R, S, T, U and that primitive shells are numbered with small letters like r, s, t, u. This relationship applies for this specification as well.

When the molecular orbital calculation is effected, there are prepared a plurality of contracted shells having different orbital quantum numbers at every atom comprising molecule to be calculated. All sets of these contracted shells are used as sets of basis functions. A combination (R, $\lambda$) of the atomic nucleus coordinate R and the orbital quantum number $\lambda$ can express one contracted shell.

[Formulas of Two-Electron Integral]

The two-electron integral G(I, J, K, L) expressed by the contracted basis function is expressed as in (formula 23) of FIG. 37 by using primitive basis function where g(i, j, k, l) is expressed by (formula 24) of FIG. 37.

Although G(I, J, K, L) is referred to as a "two-electron integral expressed by the contracted basis function" and g(i, j, k, l) is referred to as a "two-electron integral expressed by the primitive basis function", these two-electron integrals will be sometimes simply referred to as a "two-electron integral" in the following description. g(i, j, k, l) also has symmetry shown in (formula 25) of FIG. 37.

Figures 31, 32:
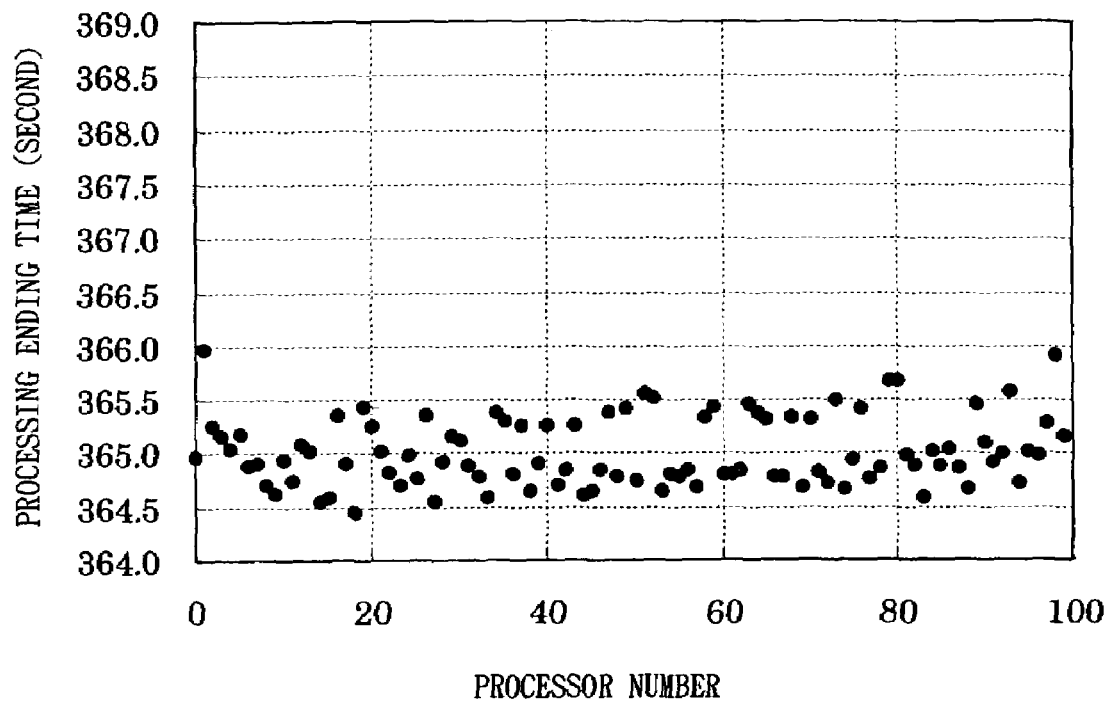
FIG. 31 is a diagram showing processing ending times of individual parallel processors according to the fifth embodiment of the present invention.
FIG. 32 is a diagram showing examples of correspondences in which primitive basis functions are associated with angular momentum, orbital exponent and atomic nucleus coordinates.

The primitive basis function $\psi$ can be uniquely expressed by a combination of angular momentum n, orbital exponent $\zeta$ and atomic nucleus coordinates R. i-th, j-th, k-th, l-th primitive basis functions are assumed to have angular momentum, orbital index and atomic nucleus coordinates shown on the table 1 shown in FIG. 32.

To avoid complexity of description, in the following description, the two-electron integral can be expressed as [ab, cd] by using their angular momentums a, b, c, d instead of the numbers i, j, k, l of the primitive basis functions.

The efficient method of calculating two-electron integral by using the basis function sets thus prepared will be described in accordance with a literature 1 (S. Obara and A. Saika, ICP, vol. 84, no. 7, p. 3964, 1986).

When a, b, c, d are all s orbitals, i.e. a=$0_a$=(0, 0, 0), b=$0_b$=(0, 0, 0), c=$0_c$=(0, 0, 0), d=$0_d$=(0, 0, 0), the two-electron integral of (formula 24) is calculated as in (formula 26) to (formula 34) of FIG. 38.

While [ . . . , . . . ]$^{(m)}$ denotes an auxiliary integral and m denotes an auxiliary index, these will be described later on. The integral on (formula 27) ranges from 0 to 1.

When even one of a, b, c, d is other than s orbital, integral is calculated by recurrence formulas shown in (formula 35) and (formula 36) of FIG. 39.

The suffix i in (formula 35) expresses x or y or z component. $1_i$ denotes a vector in which i component is 1 and other components are 0. Further, Ni (n) shows a value of i component of angular momentum n. (Formula 35) has features such that one of angular momentums appeared on the auxiliary integral of the left-hand member decreases equal to or more than 1 on the right-hand member reliably and that the auxiliary index of the auxiliary integral on the left-hand member is the same or increases 1 on the right-hand member.

The auxiliary integral $[\ldots,\ldots]^{(m)}$ coincides with the two-electron integral $[\ldots,\ldots]$ when the auxiliary index m is 0 and is adapted to assist calculation of two-electron integral. The two-electron integral which contains basis function, regardless of a magnitude of its angular momentum, can decrease angular momentum by repeatedly using (formula 35) and can reach an auxiliary integral in which all angular momentums are (0, 0, 0) in the end. Since the auxiliary integral in which the angular momentum is (0, 0, 0) can be calculated by (formula 26), if a numerical value of such auxiliary integral is multiplied with a proper coefficient and added, then there can be obtained a numerical value of two-electron integral. The calculation is actually performed as follows.

First, in accordance with (formula 35), two-electron integral is expressed in the form using not greater than eight auxiliary integrals. Further, (formula 35) is applied to a resultant auxiliary integral. A procedure in which such procedure is repeated and the auxiliary integral reaches the auxiliary integral in which all angular momentums are (0, 0, 0) is recorded as a calculation plan.

Next, the auxiliary integral in which the angular momentum is (0, 0, 0) is calculated by using (formula 26). Calculation is started from the resultant auxiliary integral and a numerical value of auxiliary integral is calculated in accordance with the aforementioned calculation procedure. In the end, there can be obtained a numerical value of a target two-electron integral.

Another important feature of (formula 35) is that exactly the same calculation procedure as the above-mentioned calculation procedure can be used even when combinations of orbital index and atomic nucleus coordinates are different if combinations of four angular momentums appeared on the two-electron integral are the same. When calculation is executed, it is sufficient that only the coefficient multiplied with the auxiliary integral may be changed in response to orbital index and atomic nucleus coordinates.

[Cut-off]

As described above, the number of two-electron integrals expressed by contracted basis functions to be calculated becomes $N^4$ relative to the number N of the contracted basis functions. While the numerical value of the two-electron integral expressed by the primitive basis function should be obtained in actual practice rather than the numerical value of the auxiliary integral expressed by the contracted basis functions, the total number of such two-electron integral expressed by the primitive basis function ranges from several times to several 10 s of times of the number of the two-electron integral expressed by the contracted basis function.

As a first method of decreasing the number of two-electron integrals, there can be used a method that uses the symmetry described in (formula 19) or (formula 25). However, according to this method, the calculation amount of the two-electron integral can be decreased to only ⅛ with highest efficiency.

Another method is a method of aggressively excluding two-electron integral calculations that can be judged to be unnecessary. Unnecessary two-electron integrals can be judged as follows.

As described above, numerical values of all two-electron integrals are calculated based upon numerical values of auxiliary integral $[00, 00]^{(m)}$ in which al angular momentums are (0, 0, 0) shown in (formula 26). Accordingly, it is possible to judge based upon the numerical values of $[00, 00]^{(m)}$ contribution of the numerical value of the two-electron integral to the numerical value of the Fock matrix element lies in a range of calculation error. Further, the magnitude of the numerical value of $[00, 00]^{(m)}$ can be judged based upon the value of the function $K(\zeta,\zeta', R, R')$ shown in (formula 29) and further based upon the magnitude of (formula 37) of FIG. 39.

Accordingly, it can be determined by estimating the magnitude of the first function K of (formula 26) based upon combinations of numerical values of $(\zeta_a, A, \zeta_b, B)$ whether or not two-electron integral [a b, * *] should be calculated. Further, it can be determined by estimating the magnitude of the second function K of (formula 26) based upon combinations of numerical values of $(\zeta_c, C, \zeta_d, D)$ whether or not two-electron-integral [* *, c d] should be calculated.

Figure 29:
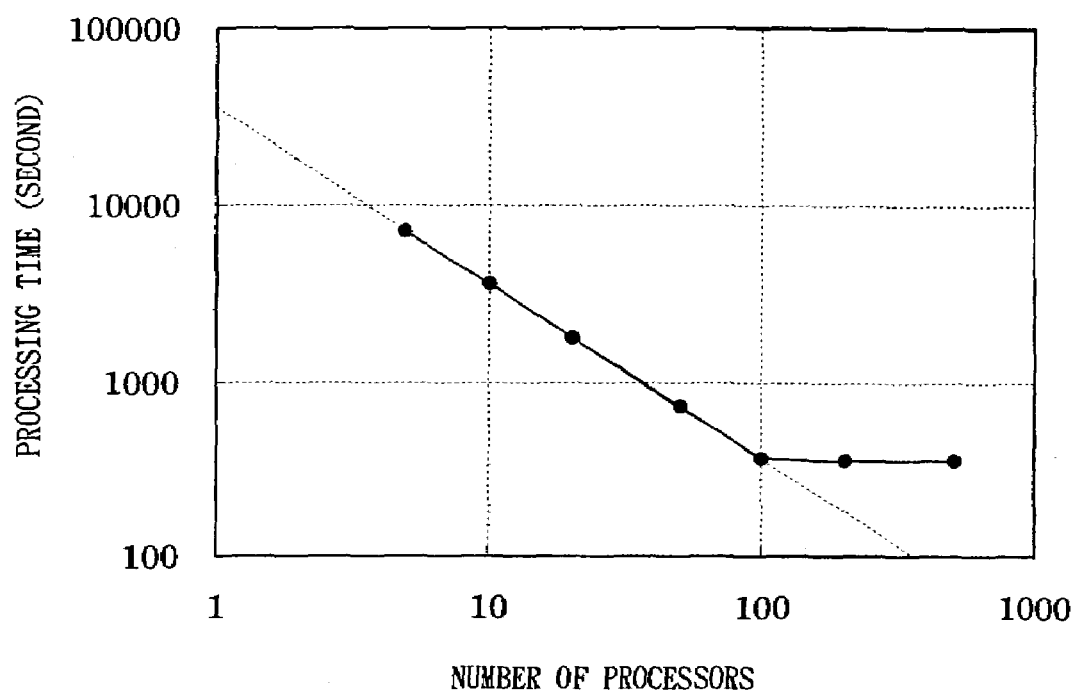
FIG. 29 is a diagram showing a relationship between the number of parallel processors and SCF calculation processing times according to the fifth embodiment of the present invention.

To exclude calculation of unnecessary two-electron integral as described above is referred to as a "to cut-off". In the above-described example, when calculation of two-electron integral is cut-off based upon the judgment of only information of a and b, this cut-off is referred to as a "cut-off by ab". When calculation of two-electron integral is cut-off based upon the judgment of only information of c and d, this cut-off is referred to as a "cut-off by cd". The reason that it can be determined based upon only ab or cd whether or not calculation of two-electron integral should be cut-off is that the maximum value of (formula 37) of FIG. 29 is 1 and a lower limit value is 0. According to this cut-off, the number of two-electron integrals that should be calculated becomes approximately the number proportional to $N^2$, and hence a calculation amount can be decreased considerably.

As described above, when N is large, effects for decreasing the calculation amount by cut-off are stronger than effects achieved by using symmetry of two-electron integral. When this effect done by the cut-off is used, it is to be understood that the processing time needed to calculate Fock matrix in the ab initio molecular orbital can be reduced considerably.

[Example of Molecular Orbital Computer System]

FIG. 1 is a block diagram showing an overall arrangement of an example of a parallel calculation system to which a method according to this embodiment is applied. This system is disclosed in the previously-described literature 1. Specifically, in this system, a plurality of processor elements 2 is connected to a host computer 1 through a common bus 3.

Figure 2:
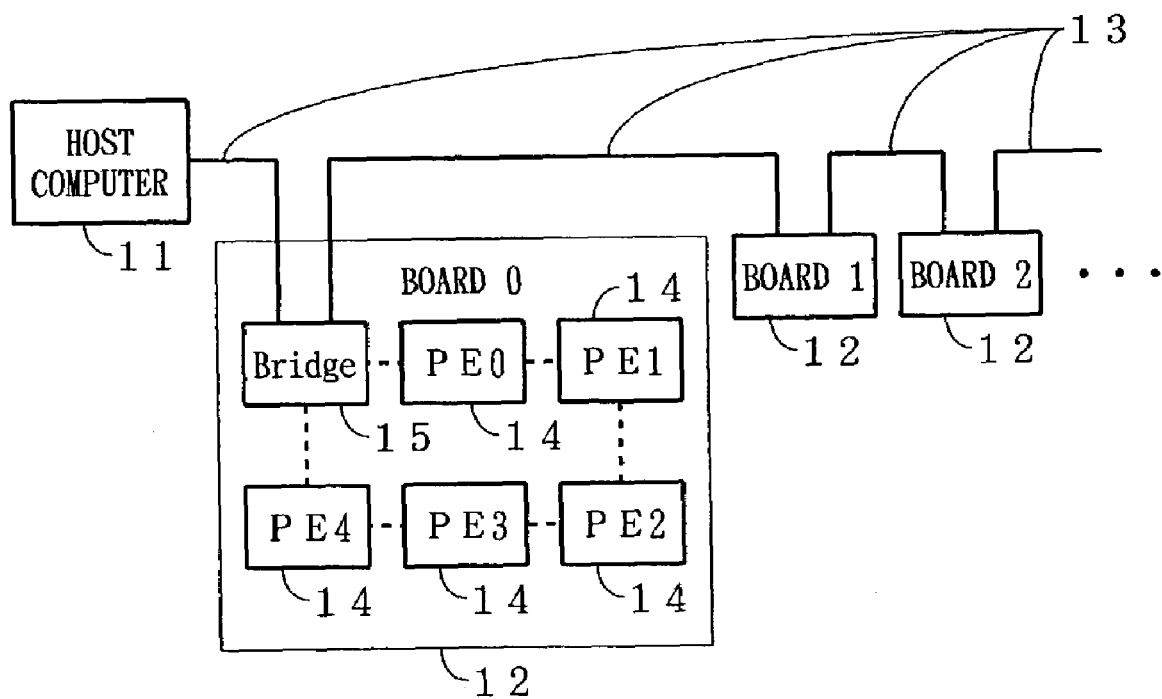
FIG. 2 is a block diagram showing another example of a computer system that is used in embodiments of the present invention.

FIG. 2 is a block diagram showing an overall arrangement of an example of a parallel calculation system to which a method according to this embodiment is applied. This system is disclosed in the previously-described literature 2. In the system of the example shown in FIG. 2, a plurality of boards 12 is connected to a host computer 11 by a serial bus 13 in a daisy-chain fashion. The bus 13 may be an IEEE 1394 serial bus, for example.

Each board 12 includes a plurality of processor elements 14 connected in series and a bridge 15 for connecting the bus 13 with a plurality of processor elements 14.

In the system on the literature 1 or 2 shown in FIG. 1 or 2, there is a limit on a memory storage capacity that can be connected to individual parallel processor elements 2 or 14. At present, each processor element 2 or 14 can be connected with a memory having a storage capacity of approximately several 10 s of megabits (hereinafter referred to as a "Mb") at best.

When the inexpensive IEEE 1394 serial bus, which is relatively high in general-purpose property, is used as a communication network for use in connecting the host computer 1 or 14 to each processor element 2 or 14 as described above, its communication performance is approximately 400 megabits/second (this will hereinafter be described as a "Mbps") at best as its peak performance.

In the embodiment according to this invention, there is used a novel Fock matrix generation algorithm in which the computer system with the above-mentioned arrangement does not need high communication performance and in which, even when memory connected to each processing node, i.e. processor element has the above-mentioned actual storage capacity, calculation can be executed efficiently.

[Description of Novel Fock Matrix Generation Algorithm]

A Fock matrix generation algorithm which can make efficient parallel calculation become possible will be described with reference to FIG. 3 which shows such algorithm in the form of a program code.

Although FIG. 3 shows that such novel algorithm comprises a quadruple loop concerning contracted shells R, S, T, U and a quadruple loop concerning internal contracted bases I, J, K, L for convenience sake of explanation, in actual algorithm, the outermost loop is a loop concerning a combination (RT) of contracted shells R and T which can satisfy relationships of $R \leq Nmax$ (Nmax is the maximum value of numbers given to N contracted shells. When numbers from 0 to N are given to contracted shells, Nmax=N) and $R \geq T$. Then, a second loop may be used as a loop concerning the contracted shell S and a third loop may be used as a loop concerning the contracted shell U. In the inside of the third loop, the function value G(R, S, T, U) is calculated and a part of a predetermined Fock matrix element F is calculated by using a calculated result.

The second loop may be used as the loop concerning the contracted shell U, and the third loop may be used as the loop concerning the contracted shell S. Specifically, although the loop concerning the contracted shell U is formed at the inside of the loop concerning the contracted shell S, the order of this loop may be reversed.

Loops concerning the combinations of the contracted shells R and T are controlled on the host computer and processing of portions of loops concerning the loops concerning the contracted shells S and U in which the combinations of the contracted shells R and T are fixed is assigned to the processor element. The two second and third loops in which the contracted shells R and T are fixed are collected as one job unit and a plurality of processor elements 2 or 14 processes job at this job unit.

Since jobs are assigned to a plurality of processor elements at the RT pair unit as described above, in the following description, this algorithm will be referred to as a "RT parallel algorithm".

At that time, the host computer 1 or 11 executes calculation of initial values of all matrix elements P, executes the SCF calculation together with the processor elements and determines whether or not this SCF calculation should continue. When the SCF calculation is executed, the host computer 1 or 11 determines assignment of job unit in which the contracted shells R and T are fixed, selects the matrix element of a part of the matrix P that should be transmitted to the processor elements, transmits the selected matrix element to the processor elements, receives the matrix element of a part of the matrix F transmitted from the processor element and updates the matrix P by using the matrix F.

On the other hand, the processor element 2 or 14 receives the matrix element of a part of the matrix F transmitted from the host computer 1 or 11, controls the loop concerning the contracted shell S, controls the loop concerning the contracted shell U, calculates the function G(R, S, T, U) and the function g(i, j, k, l), calculates the matrix element of a part of the matrix F and transmits the matrix element of a part of the matrix F to the host computer 1 or 11.

The contracted shell R may take values ranging from 0 to Nshell−1 and the contracted shells S, T, U may take values ranging from 0 to R. Then, I may take all contracted basis numbers belonging to the contracted shell R, J may take all contracted basis numbers belonging to the contracted shell S, K may take all contracted basis numbers belonging to the contracted shell T and L may take all contracted basis numbers belonging to the contracted shells U, respectively.

In FIG. 3, assuming that contracted basis are numbered in such a manner that the contracted basis belonging to the same contracted shell are numbered with continuous numbers, the ranges of I, J, K, L respectively lie in a range of from b_basis (R) to e_basis (R), from b_basis (S) to e_basis (S), from b_basis (T) to e_basis (T) and from b_basis (U) to e_basis (U).

b_basis (X) and e_basis (X) represent a minimum value and a maximum value of a contracted basis which belongs to the contracted shell X. In the inside of the quadruple loop concerning the contracted basis, the two-electron integral (I, J, K, L) is calculated and the Fock matrix element is calculated. As the density matrix elements that are used herein, there are four density matrix elements of P(K, L), P(I, J), P(K, L), P(I, L). As the Fock matrix elements that should be calculated, there are four matrix elements of F(I, J), F(K, L), F(I, L), F(K, J).

Since I and k are the contracted basis that form the contracted shells R and T, respectively, when jobs are assigned to the processor elements, these contracted shells are fixed to several ones (one contracted basis when the contracted shell is s orbital, three contracted basis when the contracted shell is p orbital and six contracted basis when the contracted shell is d orbital). The contracted basis J and L may be changed freely.

While FIG. 3 shows that the contracted shells S and U may take all values of R+1 contracted shells ranging from 0 to R in order to simplify descriptions of codes, in actual practice, the contracted shells S and U may not take all values in that range.

When the cut-off by ab between all contracted basis belonging to the contracted shell R and all contracted basis belonging to the contracted shell S is established, calculation of all G(I, J, *,*) can be omitted so that the contracted shell S need not take such values. In accordance therewith, since P(I, J), P(K, J) are not used and F(I, J), F (K, J) are not calculated, these need not be communicated between the host computer and the processor elements.

Similarly, when the cut-off by cd between all contracted basis belonging to the contracted shell T and all contracted basis belonging to the contracted shell U is established, since calculation of all G(*, *, K, L) can be omitted, the contracted shell U need not take such values. In accordance therewith, since P(I, L), P(K, L) are not used and F(I, L), F(K, L) are not calculated, these need not be communicated between the host computer and the processor elements.

Accordingly, not only the calculation amount can be decreased by reducing the number of following the loops concerning the contracted shells S and U but also the traffic can be decreased by eliminating communications of unnecessary matrix elements.

Figure 4:
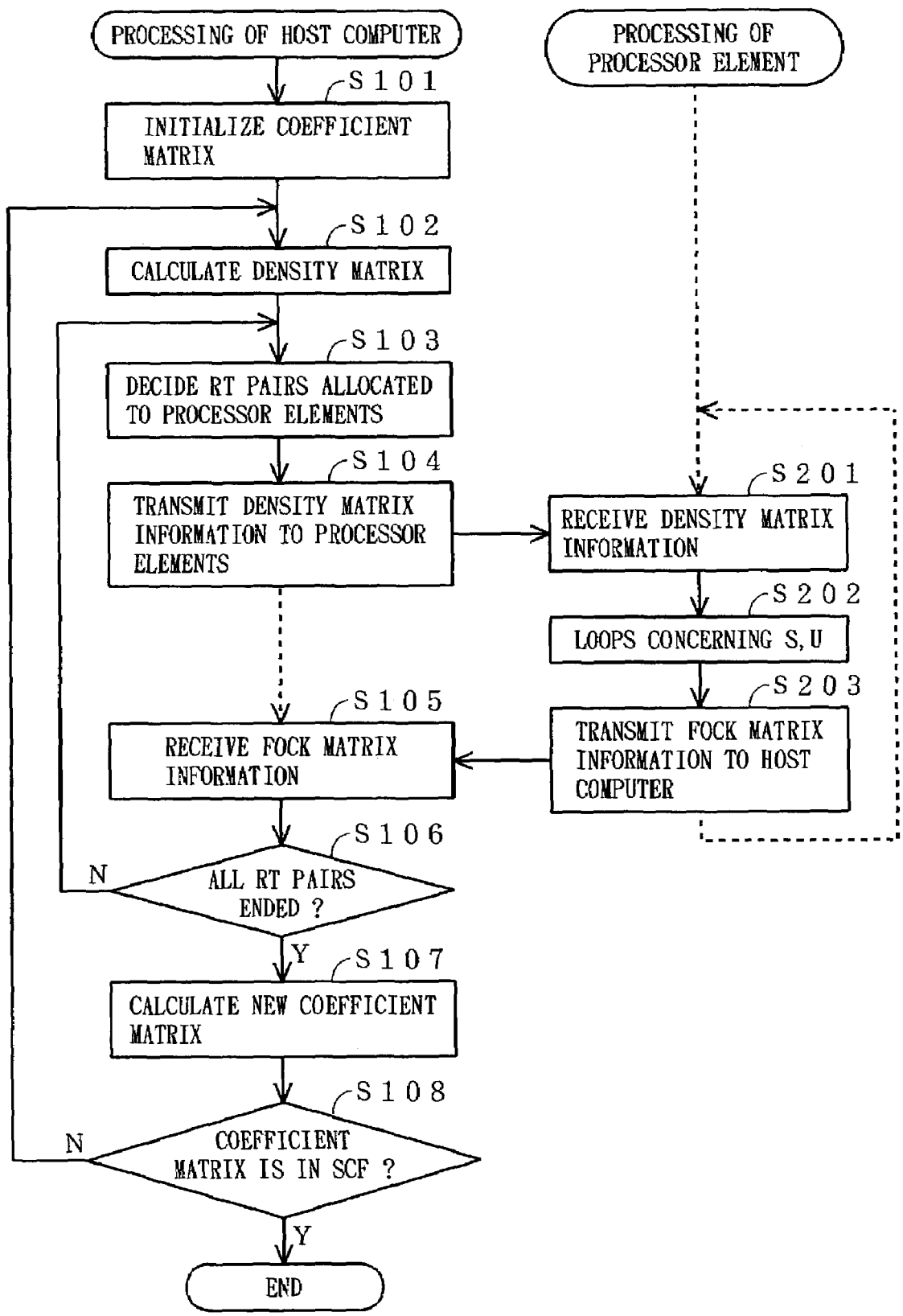
FIG. 4 is a diagram showing a flowchart of an RT parallel algorithm according to an embodiment of the present invention.

A flow of processing using the RT parallel algorithm will be described with reference to a flowchart of FIG. 4. In the following description, there is used the system shown in FIG. 2. FIG. 4 shows respective flowcharts because the host computer 11 and the processor element 14 execute different processing.

Although it is assumed that a plurality of processor elements 14 (typically, 100 processor elements) are connected to the host computer 11 in parallel, since these processor elements may operate in accordance with similar flowcharts and data among these processor elements are not correlated with each other, a flowchart of processing in one processor element 14 is shown representatively. Portions shown by broken-line arrows in FIG. 4 show that the succeeding processing is not rate-limited by the preceding processing and that the host computer is placed in the standby state for awaiting information from other processing system.

First, a processing procedure of the host computer 11 will be described.

After having initialized coefficient matrix (step S101), the host computer 11 enters the SCF loop. The SCF loop continues until the coefficient matrix is placed in the self-consistent field.

Specifically, within the SCF loop, the host computer calculates a density matrix from the coefficient matrix in accordance with (formula 18) (step S102). Then, the host computer enters the RT loop, whereat it determines a RT pair number that is assigned to the processor element, i.e. the number which uniquely expresses a combination of two contracted shells R and T (step S103). In the case of this example, the host computer determines the RT pair number in accordance with a calculation equation shown in (formula 38) of FIG. 39.

Although the RT pair numbers are assigned to the processor elements in the order of low numbers in accordance with the description of FIG. 3, the present invention is not always limited to the above method. So long as the processing may be effected on all combinations of the contracted shells R and T, pair numbers may be freely changed in accordance with any order of processing or the order of processing may be changed freely.

Next, the host computer transmits density matrix information, needed by a job corresponding to the above-described RT pair number, to the processor element to which the RT pair number is assigned (step S104). At that time, considering the cut-off by ab and cd, density matrix information that will not be used in calculations at the processor elements are not transmitted to the processor elements at all.

The processor element 14 receives density matrix information from the host computer 11 and stores the same in a reception buffer memory (step S201). Then, with respect to the jobs of the assigned (RT pair), the loops concerning the contracted shells S, U are controlled and Fock matrix elements are calculated (step S202). At the end of calculation, calculated Fock matrix information is stored in a transmission buffer memory and the Fock matrix information thus calculated is transmitted from the transmission buffer memory to the host computer 11 (step S203).

When the processing of a certain processor element 14 is ended as described above and the host computer 11 receives the Fock matrix information from the processor element 14 (step S105), it is determined by the host computer whether or not assignments of RT pair numbers to all processor elements and transmission of density matrix information are ended (step S107). If not, then control goes back to the step S103, whereat the host computer determines assignments of new RT pair numbers and transmits density matrix information corresponding to the RT pair numbers to the processor element 14.

After similar operations had been repeated, the host computer 11 assigns RT pair numbers to all processor elements and transmits density matrix information and is placed in the standby state for receiving the Fock matrix from the processor element.

If it is determined at the step S106 by the host computer 11 that the processing of all RT pair numbers is ended, then the host computer solves (formula 14) of FIG. 26 based upon collected Fock matrix information and calculates new coefficient matrix (step S107). Then, by comparing the new coefficient matrix with the immediately-preceding coefficient matrix, it is determined by the host computer whether or not a solution of self-consistent field is obtained (step S108). If both of them are sufficiently coincident with each other, then it is determined by the host computer that the solution of self-consistent field was obtained. Then, the calculation is ended. If not, then controls goes back from the step S108 to the step S102, whereat the host computer generates new density matrix in accordance with (formula 18) and similar operations are repeated.

Double buffering of data, which is frequently used to conceal the communication processing with the calculation processing as much as possible, can be also applied to the RT parallel algorithm.

Figure 5:
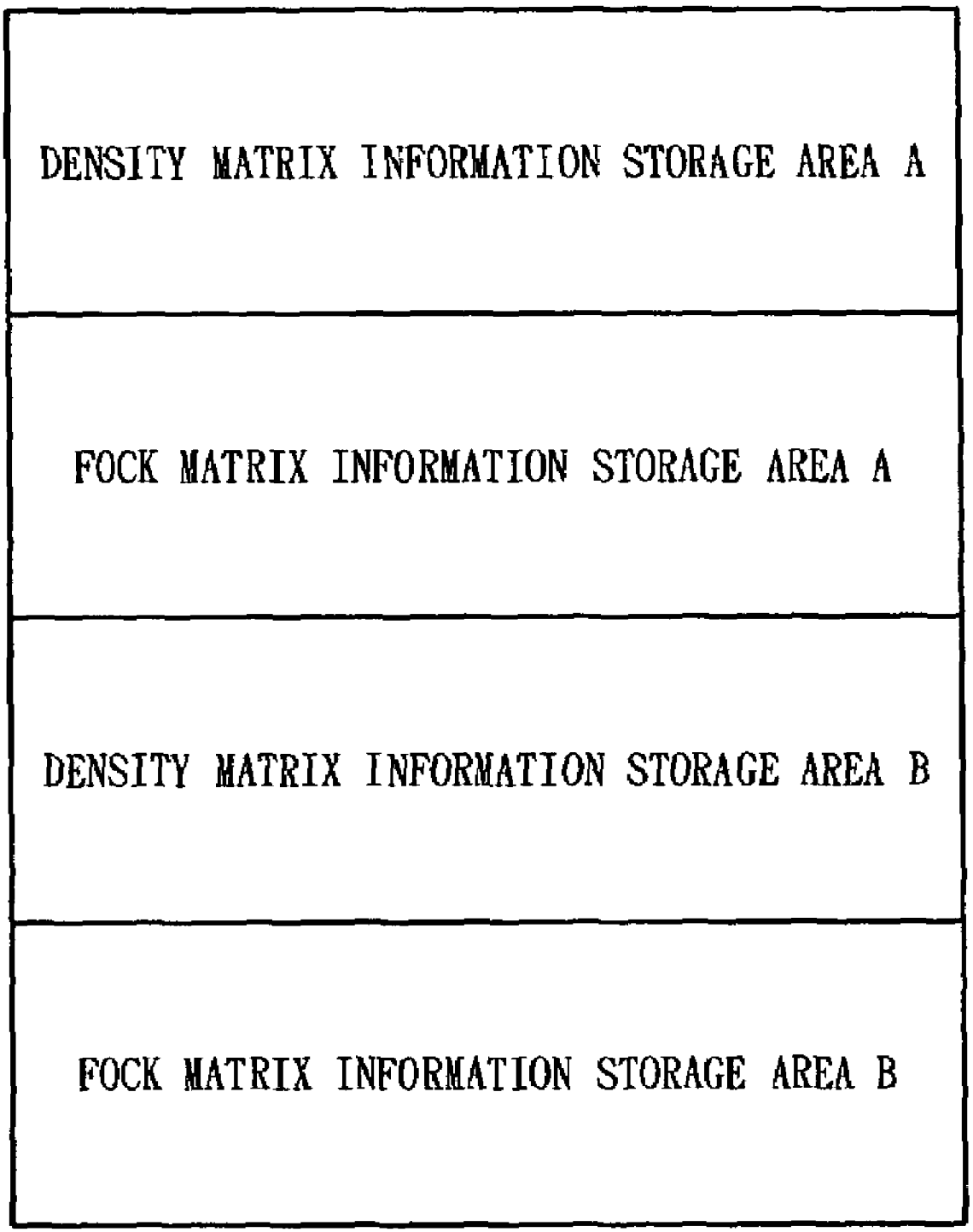
FIG. 5 is a diagram to which reference will be made in explaining the way of how to use a memory area when double buffering is effected on data used in an embodiment of the present invention.

As shown in FIG. 5, of memories of each processor element, the area for storing therein density matrix information and Fock matrix information is divided into two areas A and B.

Then, Fock matrix elements that had been calculated by using density matrix elements stored in the density matrix information storage area A (this calculation will be referred to as a "type A calculation") are stored in the Fock matrix information storage area A, and Fock matrix elements that had been calculated by using density matrix elements stored in the density matrix information storage area B (this calculation will be referred to as a "type B calculation") are stored in the Fock matrix information storage area B, respectively.

Jobs corresponding to one RT pair numbers are made corresponding to either of the type A or type B calculation. At the end of the type A calculation job, the type B calculation is started. At the end of the type B calculation job, the type A calculation is started.

Upon type A calculation, calculated results obtained by the immediately-preceding type B calculation job are stored in the Fock matrix information storage area B. The density matrix information storage area B is held as the area in which data can be overwritten freely.

Therefore, during the type A calculation job is being executed, calculated results obtained by the immediately-preceding calculation can be read out from the Fock matrix information storage area B and transmitted to the host computer. Moreover, information for use in the next type B calculation job can be received from the host computer and written in the density matrix information storage area.

During the type B calculation job is being executed, data can be similarly transmitted and received by using the area A.

When the above double buffering mechanism is in use, if data transmission and reception processing is finished during the calculation job is being processed, then it becomes possible to conceal the communication processing with the calculation processing. Hence, efficient processing can be executed. Any of the following examples of calculations employs this double buffering.

Next, a format of density matrix information will be described with reference to FIGS. 6 and 7.

Figure 6:
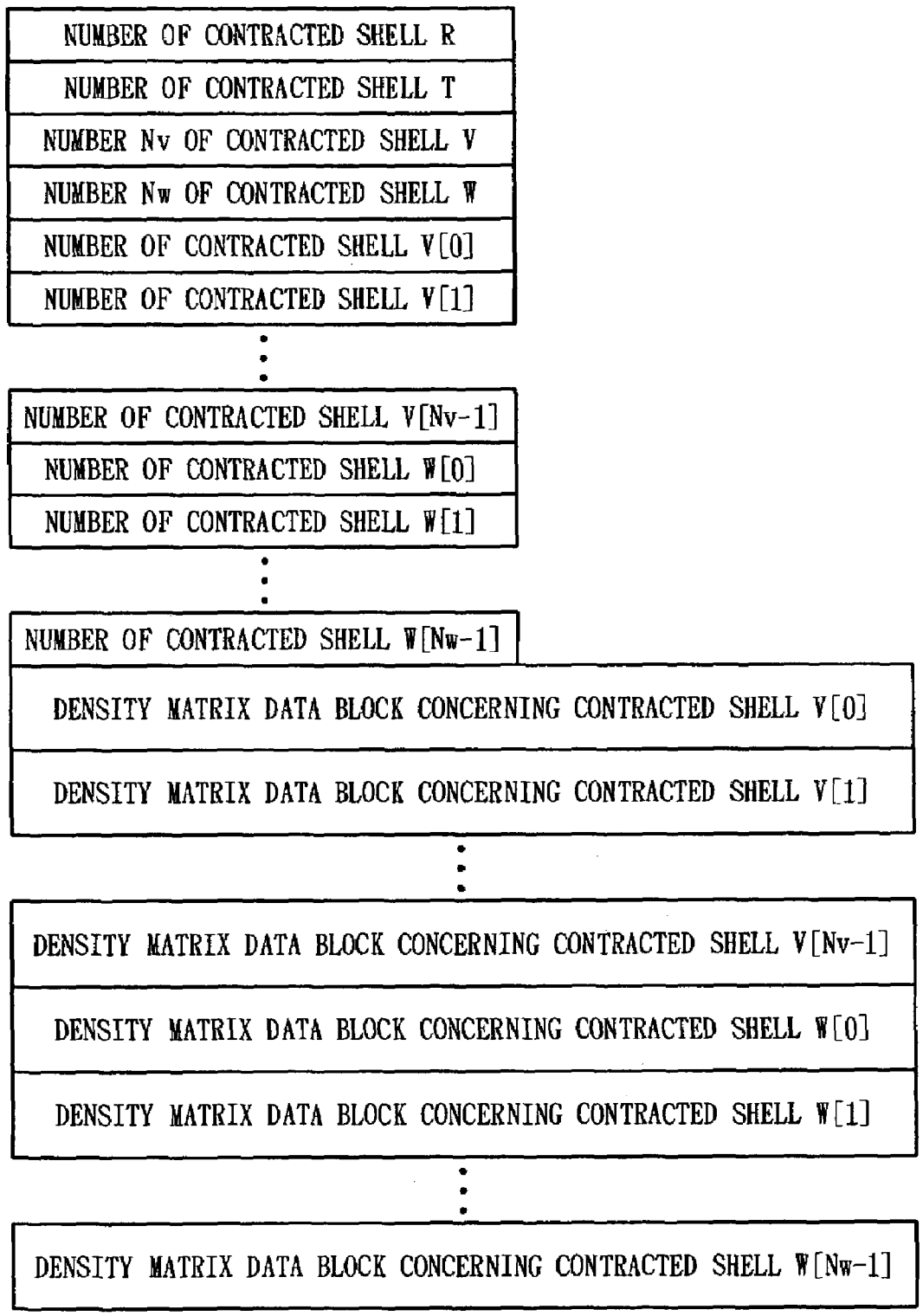
FIG. 6 is a diagram showing an example of a format of density matrix information transmitted from a host computer to processor elements according to an embodiment of the present invention.

FIG. 6 shows an example of a format of density matrix information that is transmitted from the host computer 11 to the processor element 14. Data from the numbers of the contracted shell R to the numbers of the contracted shell W [Nw−1] are integer-type data. Data block from density matrix data block concerning a contracted shell V [0] to density matrix data block concerning a contracted shell W [Nw−1] are blocks that are composed of one or a plurality of floating point type data or fixed point type data.

RT pair numbers that should be processed by the processor element 14 which has received the density matrix information are decided by the numbers of the two contracted shells R and T from above.

The numbers of the contracted shells R and T are followed by two integer-type data Nv and Nw which express the number of elements of a contracted shell set V and a contracted shell set W. The contracted shell V contains at least one basis function which survives from the cut-off by ab considering the combination with a basis function contained in the contracted shell R, i.e. a contracted shell number which S can take in the loop of the contracted shell S.

Similarly, the contracted shell W contains at least one basis function which survives from the cut-off by cd considering the combination with a basis function contained in the contracted shell T, i.e. a contracted shell number which U can take in the loop of the contracted shell U.

Figure 7:
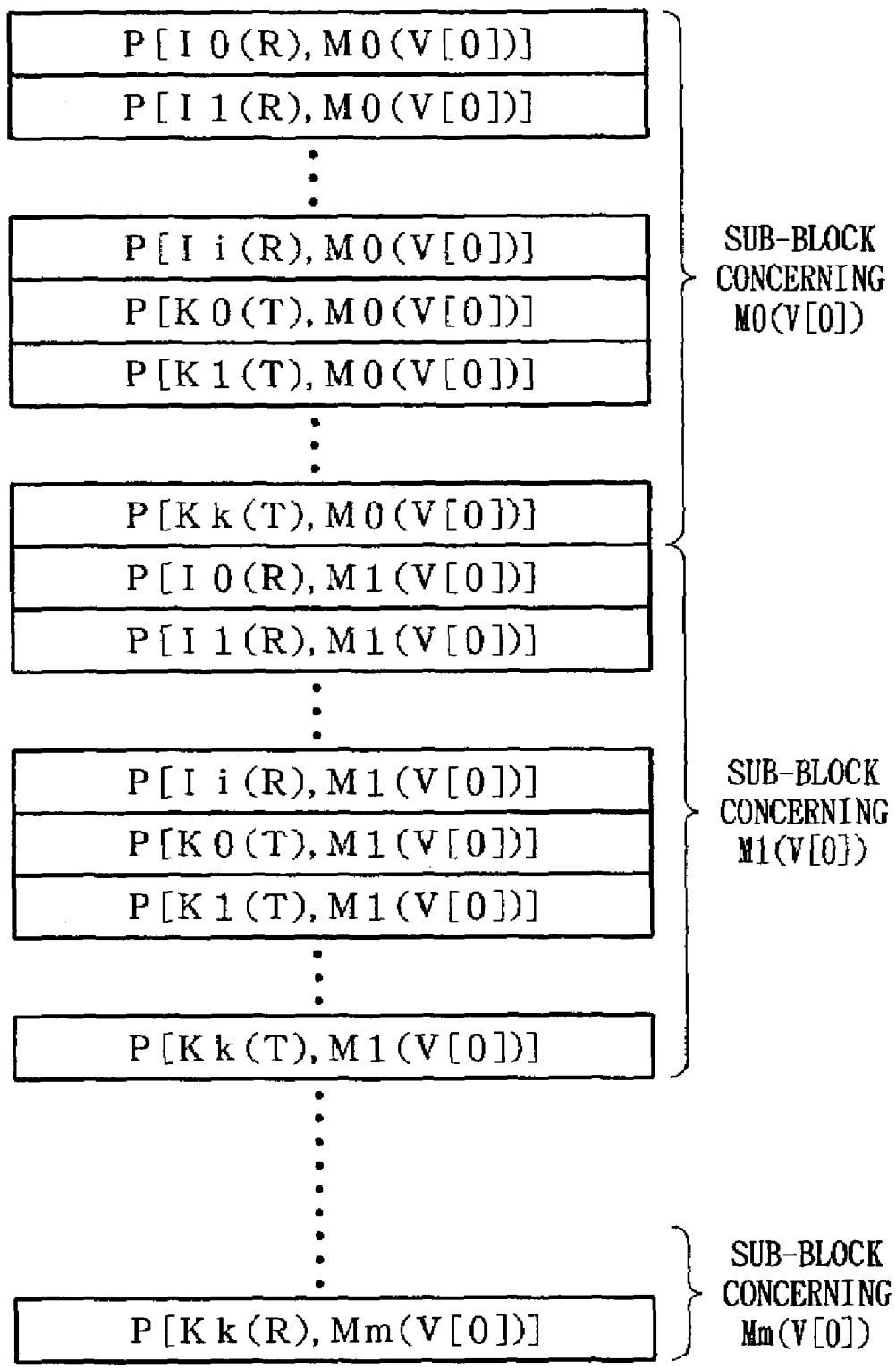
FIG. 7 is a diagram showing an example of an arrangement of density matrix data block in an embodiment according to the present invention.

FIG. 7 shows an example of a format of density matrix data block. This example shows the density matrix data block concerning the contracted shell V [0] as a representative example.

When the orbital quantum number of the contracted shell is greater than 1, the density matrix data block concerning that contracted shell is further composed of sub-blocks concerning contracted basis. The example shown in FIG. 7 illustrates the case in which there are m+1 contracted basis comprising the contracted shell V [0] as in M0(V [0], M1 (V [0], . . . , Mm (V [0]) and in which there are m+1 blocks corresponding to the respective contracted basis.

One sub-block is further separated into two areas. One area is an area of density matrix elements which use the contracted basis 10 (R) comprising the contracted shell R, Ii (R) and M0 (V [0]) as indexes. Another area is an area of density matrix elements using the contracted basis KO [T] comprising the contracted shell T, Kk (T) and M0 (V [0]) as indexes where i+1 and k+1 denote numbers of the contracted basis comprising the respective contracted shells R, T and these numbers depend upon the orbital quantum numbers of the contracted shells R, T. The number of the density matrix elements contained in these areas is determined by the orbital quantum number of the contracted shells R and T. Therefore, in a set of density matrix information, any sub-blocks become the same in size.

Although not described, the format of the Fock matrix information is similar and its data amount is the same as that of the density matrix information.

[Description of Method of Assigning Jobs to Processor Elements According to the Embodiment]

[Method of Forming Jobs and Numbering]

As will be clear from the above description, the job assigned to the processor element contains not only the calculation processing but also the communication processing with the host computer.

In this embodiment, respective jobs are formed in such a manner that a job comprising a sum of calculation processing and communication processing can be reduced in the fluctuation of magnitude (size) and that sizes of jobs can be made equal as much as possible. Since the capacity of the memory of each processor element is limited, respective jobs are formed in such a manner that the numbers of the density matrix elements and the Fock matrix elements that are to be stored in the memory can be decreased as much as possible. To this end, this embodiment may provide the following methods.

As described above, according to this embodiment, jobs are assigned to processor elements at the RT pair unit. When the RT pairs are decided, the number of tracing the loops of the contracted shells S and U is determined. Specifically, the number of tracing the loops of the contracted shells S and U increases as R increases. The number of tracing the loops of the contracted shells S and U decreases as R decreases. Accordingly, a shell having a small orbital quantum number is assigned to a job having large R, and a shell having a large orbital quantum number is assigned to a job having small R.

According to this arrangement, in the case of the RT pair having large R, although the number of tracing the loops of the contracted shells S and U increases, the orbital quantum number of contracted shells assigned to this job is small so that the number of tracing loops concerning contracted basis within the contracted shell decreases. Conversely, in the case of a job having small R, although the number of tracing the loops of the contracted shells S and U increases, the orbital quantum number of the contracted shell is large so that the number of tracing loops concerning contracted basis within the contracted shell increases. Therefore, fluctuations of the calculation amount dependent upon the jobs determined by the RT pair can decrease.

In the case of a job in which the number of R of the RT pair is large, although Nv, Nw in FIG. 6 increase, since the orbital quantum number of contracted shells assigned to this job is small, the data amount of density matrix information can be prevented from increasing too much. As a consequence, fluctuations of the traffic dependent upon jobs can decrease.

Therefore, fluctuations of sizes of jobs can decrease.

When the RT pair has large R number, since Nv, Nw increase, the whole capacity should be suppressed by decreasing the data amount of the sub-blocks. The data amount of the sub-blocks depends upon the orbital quantum number as described before, and sub-blocks concerning contracted shell having small orbital quantum number can decrease in data amount.

According to this embodiment, the orbital quantum number of the contracted shell in which R of the RT pair has large number may decrease. Conversely, when R of the RT pair has small number, since Nv, Nw are small, the data amount of sub-blocks need not be decreased so that the orbital quantum number of the contracted shell having small number may increase.

Accordingly, as described above, since the shell having the large orbital quantum number is assigned to the contracted shell having the small number and the shell having the small orbital quantum number is assigned to the contracted shell having the large number, even a memory having a small capacity can be applied to molecular orbital calculation.

In this embodiment, since jobs are assigned to processor elements at the RT pair unit, the job number is equivalent to the RT pair number. Although the RT pair number can be determined arbitrarily as mentioned before, if it is determined in accordance with (formula 38) of FIG. 39, then the job numbers can be assigned to the processor elements in the sequential order of larger R and T.

[First Inventive Example of Job Assignment Method]

In this example, there was used the computer system shown in FIG. 2. In this example, Glycine-Alanine-Glutamine (hereinafter referred to as a "GAQ" and its molecular formula is $C_{16}H_{18}N_4O_5$) which is tri-residue peptide is a target that should be calculated, and 6–311++ G(3d, 2p) was used as a basis function.

In this example, the contracted shell number Nshell is 336, the number of s orbital shell in which the orbital quantum number is 0 is 167, the number of p orbital shell in which the orbital quantum number is 1 is 112 and the number of d orbital shell in which the orbital quantum number is 2 is 57.

In this example, the contracted shell numbers from 0 to 56 were assigned to the d orbital shells, the contracted shell numbers from 57 to 168 were assigned to the p orbital shells, and the contracted shell numbers from 169 to 335 were assigned to the s orbital shells.

Further, in this example, the RT pair numbers, i.e. job numbers were determined in accordance with (formula 38) of FIG. 39 and jobs were assigned to processor elements in the sequential order of smaller RT pair numbers.

Figure 8:
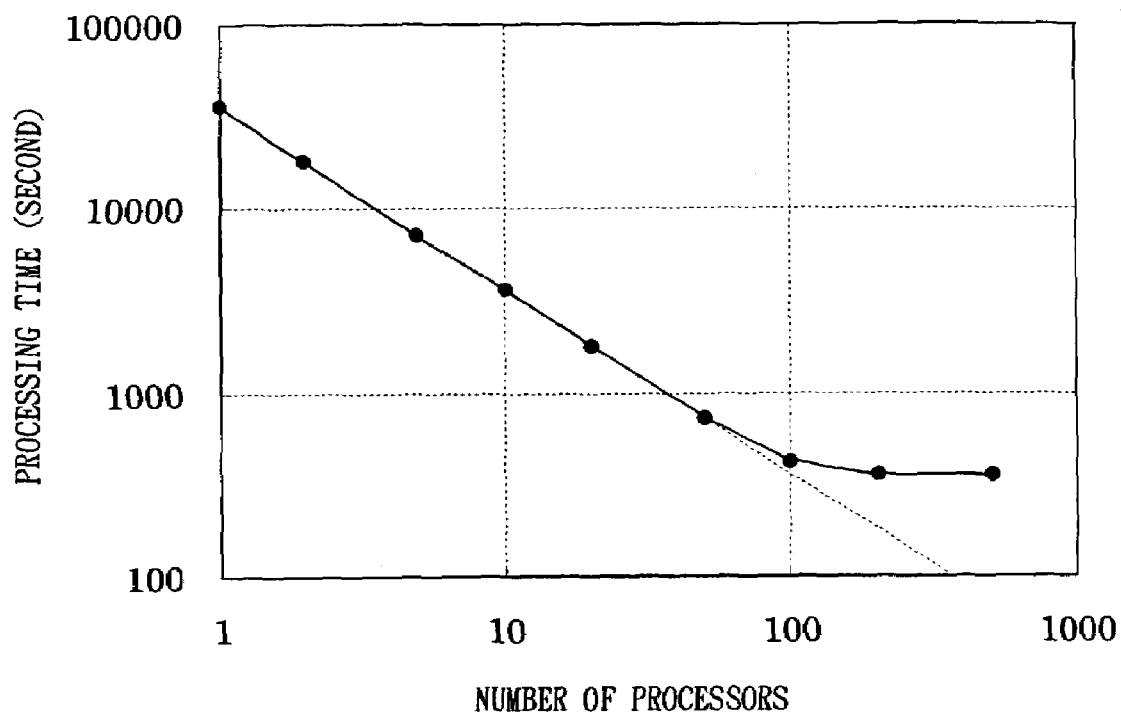
FIG. 8 is a diagram showing a relationship between the number of parallel processors and SCF calculation processing time in molecular orbital calculation according to a first embodiment of the present invention.

FIG. 8 shows an example of a relationship between a processing time and the number of processor elements required when the SCF loop is executed only once by the RT parallel algorithm according to this inventive example.

A broken-line straight line shown in FIG. 8 shows an ideal case in which the processing time decreases in inverse proportion to the number of processor elements. From this first example, it is to be understood that, when the number of processor elements increases up to approximately 100, a straight line becomes distant from the ideal straight line so that scalable parallel processing cannot be obtained.

Figure 9:
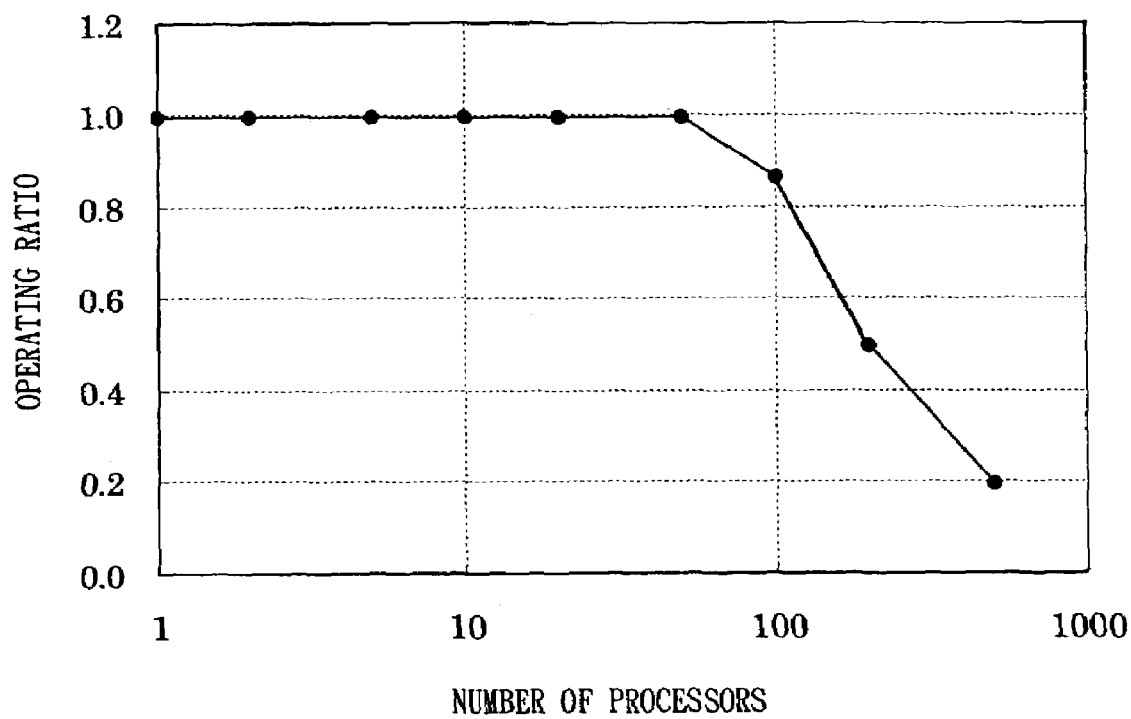
FIG. 9 is a diagram showing a relationship between the number of parallel processors and operating ratio of processors in molecular orbital calculation according to the first embodiment of the present invention.

FIG. 9 shows a ratio (operating ratio) between a whole processing time and a time during which a processor element is processing data according to the first inventive example, and shows that an operating ratio is lowered when the number of processors is approximately 100.

The cause for this may be considered that while a whole calculation throughput increases as the number of processor elements increases, when a traffic increases under the condition that a communication performance between the host computer and the processor element is constant, a communication time exceeds a calculation time so that a time in which a processor element is placed in the standby state for receiving data and is unable to execute calculation.

Another possible cause in which the parallel processing does not become the scalable parallel processing is that loads of calculation is not equally assigned to the parallel processors. However, having examined distributions of processing end times in all processor elements shown in FIG. 10, it is to be understood that loads of calculation were assigned to the parallel processors nearly equally.

A total of calculation times in the parallel processor elements is 36389 seconds. When this total calculation time is equally assigned to 100 processors, calculation processing time becomes 363.89 seconds. On the other hand, a total communication time is 363.02 seconds and is nearly equal to the calculation time.

Figure 10:
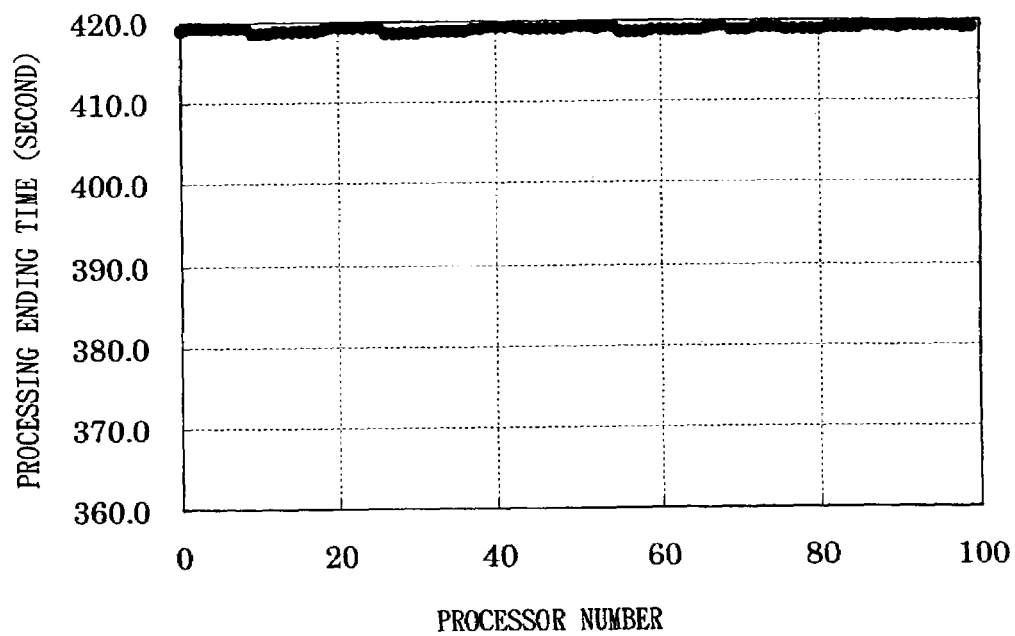
FIG. 10 is a diagram showing processing end times of individual parallel processors in molecular orbital calculation according to the first embodiment of the present invention.

However, as shown in FIG. 10, the calculation time in each processor element in the parallel processing of the first example is approximately 420 seconds. Accordingly, the parallel processing in the first example is poor in efficiency.

Figure 11:
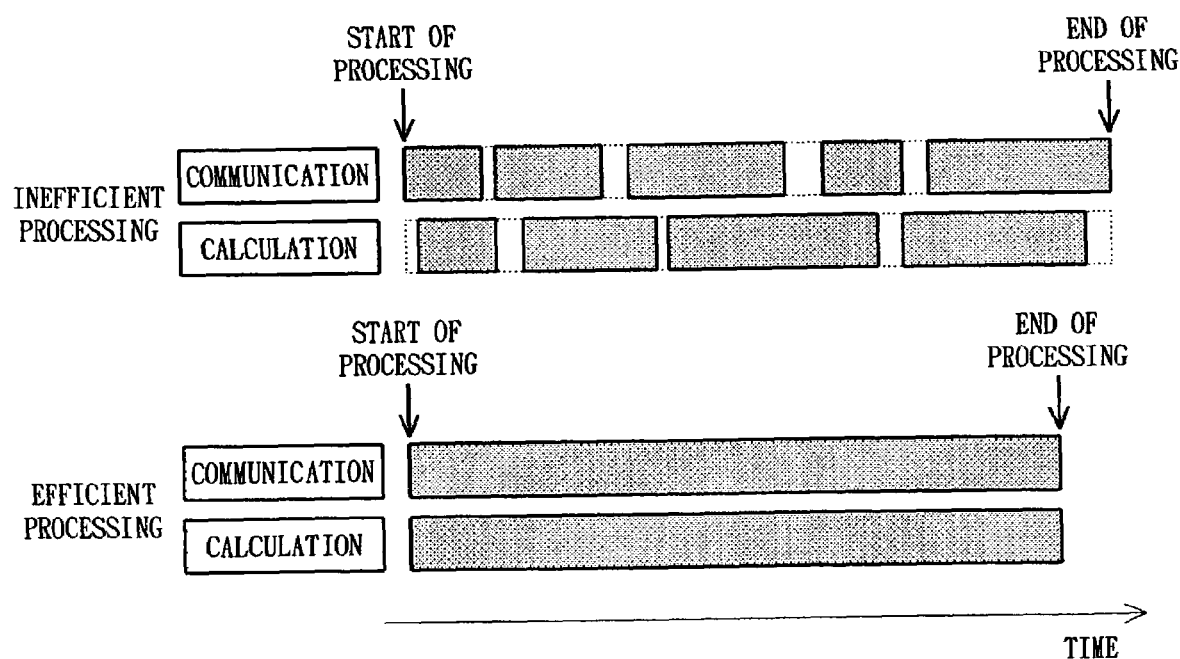
FIG. 11 is a schematic diagram showing the situations in which communication processing and calculation processing in a processing method with excellent efficiency and a processing method with poor efficiency are progressing.

FIG. 11 schematically shows the progresses of the communication processing and the calculation processing in the single processor element in the form of comparison of the efficient processing and the inefficient processing. Half-tone portions in FIG. 11 show time zones of processing. A total length of the half-tone portions is the same in the communication and the calculation. Also, this total length of the half-tone portions is the same in the efficient processing and the inefficient processing.

In the case of the inefficient processing, as shown in the sheet of drawing, there are blank portions both for the communication and the calculation. As a result, it takes a lot of time up to the end of the processing on the whole. On the other hand, if the efficient processing is executed, then the communication processing and the calculation processing can be executed without interruption and a time required up to the end of the processing can decrease.

Figure 12:
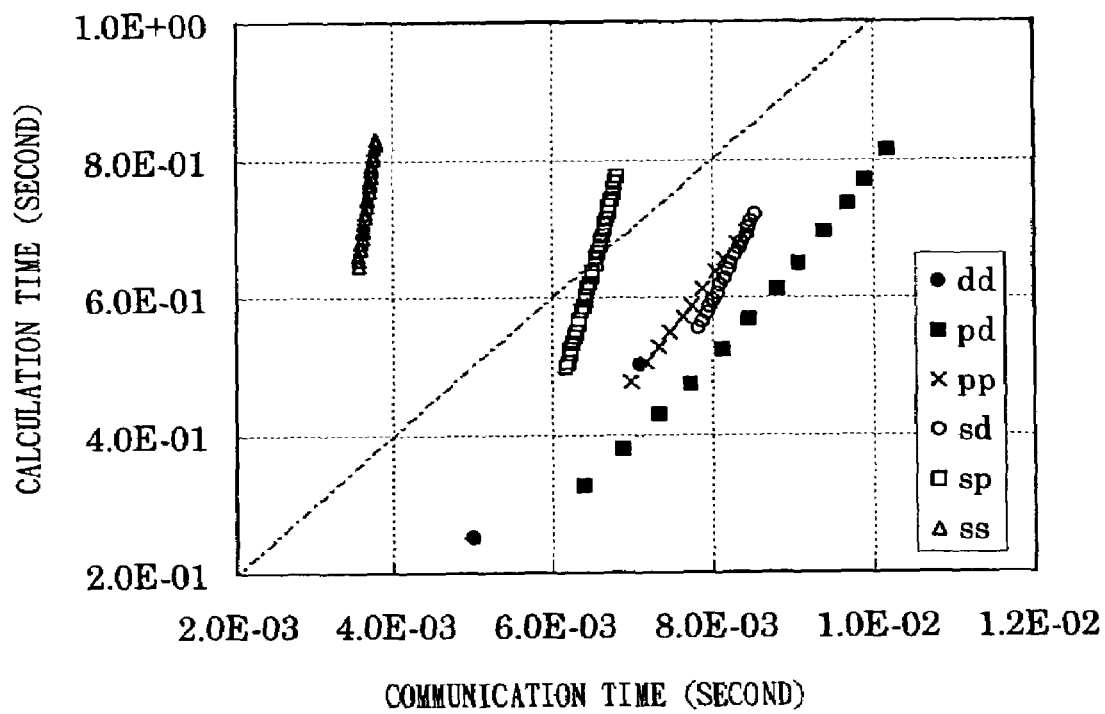
FIG. 12 is a diagram showing a correlation between traffic and a calculation amount produced per job in the molecular orbital calculation according to the first embodiment of the present invention.

FIG. 12 shows a relationship between a calculation time and a communication time produced per job in the above-mentioned first inventive example. FIG. 12 shows potted results obtained when 100 jobs were extracted from totally 56616 jobs at an equal interval with respect to the job numbers. As shown by reference indexes in FIG. 12, shapes of plots are changed in response to combinations of orbital quantum numbers of the contracted shells R and T in the job. For example, a combination (p d) of a combination of the case in which the orbital quantum number of the contracted shell R is 1, i.e. p orbital and the orbital quantum number of the contracted shell T is 2, i.e. d orbital was plotted as a solid square.

As is clear from FIG. 12, even though the fluctuation of the job size is small, ratios between communication times and calculation times differ depending upon jobs. A dot-and-dash line in FIG. 12 shows a line in which a ratio between a communication time and a calculation time is 0.01. When the number of the processor elements is 100, if there are many jobs in which the ratios between the communication times and the calculation times are under this line, then traffic increases and a standby time is produced in the calculation processing. Conversely, if there are many jobs in which the ratios between the communication times and the calculation times are located above this line, then a calculation amount increases and a communication processing can be concealed with ease.

As mentioned before, when the whole communication time and calculation time are nearly equal, if the assignment of jobs is controlled in such a manner that an average value of ratio between traffic and calculation amount concerning the jobs that are executed parallelly at that time becomes equal to the dot-and-dash line at any time, then efficient parallel processing can be executed.

In this example, when the contracted shell numbers are determined, as mentioned before, since the data amount of the density matrix information can be prevented from increasing in the large R such that the shell in which the orbital quantum number is large is assigned to the low number and that the shell in which the orbital quantum number is small is assigned to the high number, fluctuations of traffic dependent upon the job number can decrease as a result. Moreover, when the contracted shell number is determined as described above, fluctuations of the calculation amount dependent upon the job number also can decrease.

When the contracted shell numbers are not determined in such a manner that the shell in which the orbital quantum number is large is assigned to the low number and that the shell in which the orbital quantum number is small is assigned to the high number, fluctuations of the calculation time and the communication time dependent upon the job numbers become larger than those shown in FIG. 12. Accordingly, it becomes more difficult to equally assign calculation loads to a plurality of processor elements.

Having examined the relationship between the calculation time and the communication time per job shown in FIG. 12, it is to be understood that all of the cases in which the contracted shells R and T are both in the s orbital and part of the case in which the contracted shell R is in the s orbital and the contracted shell T is in the p orbital are plotted in the areas above the dot-and-dash line.

Having the above relationship more in detail, it is to be understood that, when the job number that had been decided in accordance with (formula 38) of FIG. 39 is higher than approximately 35000, plots are located above the dot-and-dash line and that when the above job number is lower than approximately 35000, plots are located below the dot-and-dash line. Specifically, when a job having a low RT pair number has a large ratio of a communication time relative to a calculation time and a job having a large RT pair number has a small ratio of a communication time relative to a calculation time.

In second to fifth inventive examples which will follow, jobs are formed such that fluctuations of calculation time and communication time can decrease as described above, and jobs can be assigned to processor elements more efficiently by utilizing the fact that the job having the job number determined in accordance with (formula 38) of FIG. 39 has the above-mentioned features shown in FIG. 12.

[Second Inventive Example of Job Assignment Method]

From the above-described considerations, it can be expected that communication load will be dispersed from a time standpoint by assigning jobs of low numbers and jobs of high number to processor elements in the mixed state. Accordingly, in the second inventive example, an assignment queue shown in FIG. 13 is formed and jobs are assigned to the parallel processor element 2 or 14.

Figure 13:
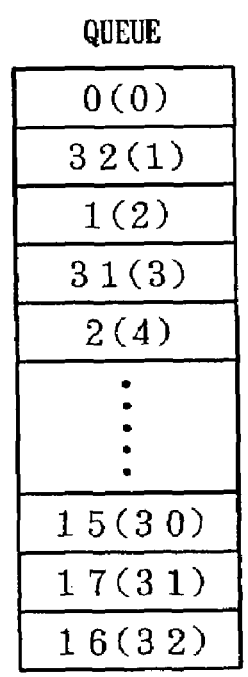
FIG. 13 is a diagram showing an example of queue matrix for use in assigning jobs to processor elements according to a second embodiment of the present invention.

To simplify the descriptions, the example shown in FIG. 13 illustrates the assignment queue required when the whole job number N is 33. Numerals in the outside of the parentheses in FIG. 13 denote job numbers and are equivalent to RT numbers in the parallel algorithm in the molecular orbital calculation. Numerals in the inside of the parentheses denote orders in which jobs are assigned to the processor element.

The host computer is able to assign jobs to the processor element while reading job numbers from this queue with reference to this queue.

The first job is set to a job whose job number is 0 and the preceding number will hereinafter be set to J.

Job whose number is N-J-1 if J is not greater than N/2
Job whose number is N-J if J is not less than N/2 is set to the next job that will be assigned to the processor element.

According to this arrangement, a job in which an RT pair number is small and a ratio between a communication time and a calculation time is large and a job in which an RT pair number is large and a ratio between a communication time and a calculation time is small are alternately assigned to the processor elements. Accordingly, an average value of ratios between traffic and quantity of calculation concerning jobs that are executed parallelly by a plurality of processor elements becomes (1/the number of processor elements) and becomes close to 0.01 when the number of the processor elements is 100. Hence, efficient parallel processing can be executed.

Figure 14:
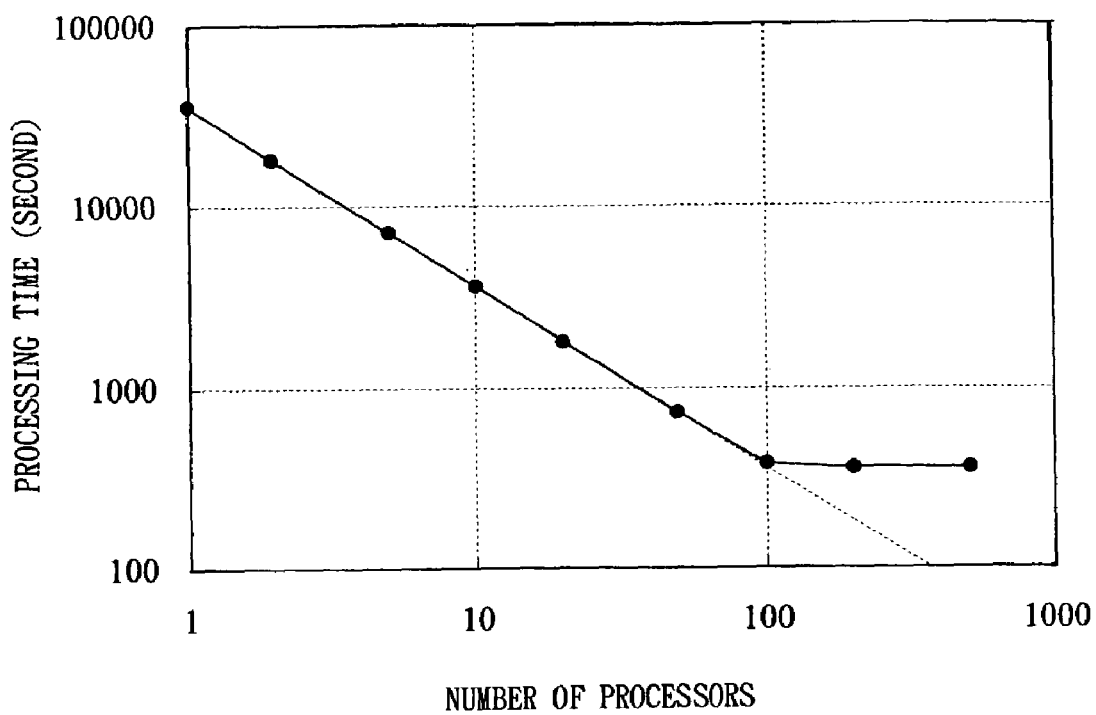
FIG. 14 is a diagram showing a relationship between the number of parallel processors and SCF processing time according to the second embodiment of the present invention.

FIG. 14 shows a relationship between a processing time and the number of processor elements in calculation of parallel processing method based upon the job assignment method according to the second inventive example. Molecule that is to be calculated in this example and basis functions used therein are the same as those of the first inventive example and whose results were shown in FIG. 8 and are GAQ and 6–311++G(3d, 2p), respectively.

Having compared results of this example with the results shown in FIG. 8, a calculation time obtained when the number of the processor elements is approximately 100 decreased about 9% and processing at speed higher than the aforementioned first inventive example became possible.

Figure 15:
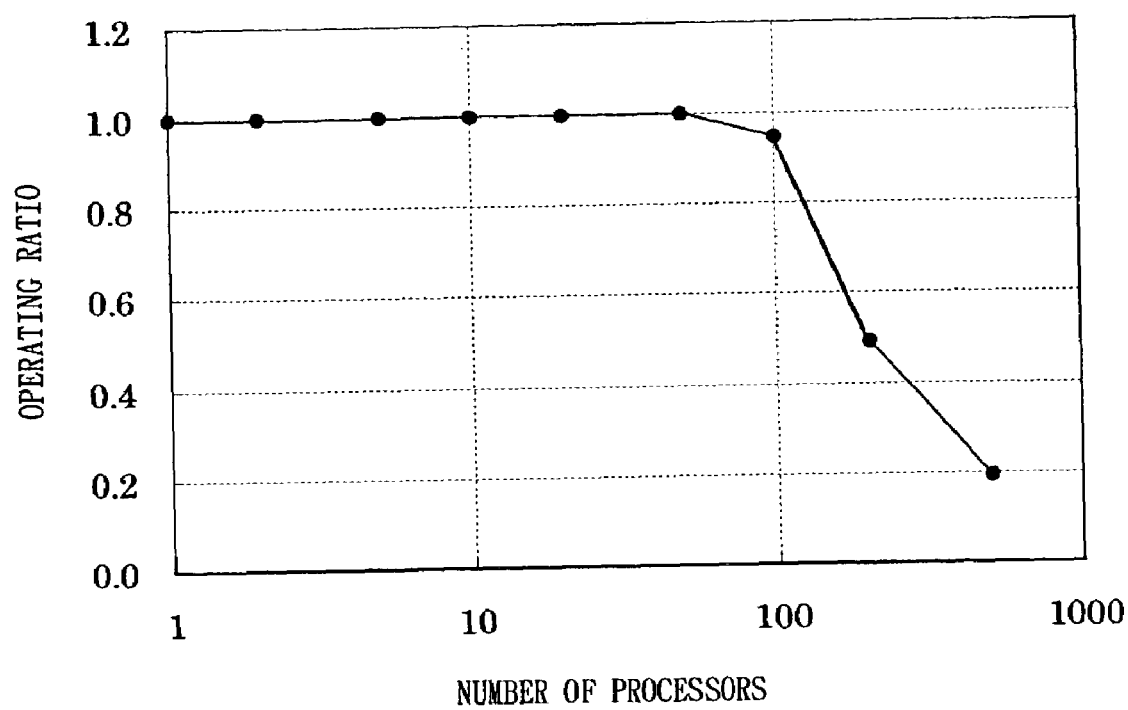
FIG. 15 is a diagram showing a relationship between the number of parallel processors and the operating ratio of processors according to the second embodiment of the present invention.

FIG. 15 shows a relationship between an operating ratio of the processor element and the number of the processor elements according to the second inventive example and which corresponds to FIG. 9 in the first inventive example.

A study of two compared results reveals that when the number of the processor elements is near 100, an operating ratio of the second inventive example could increase more as compared with the first inventive example.

Figures 16, 17:
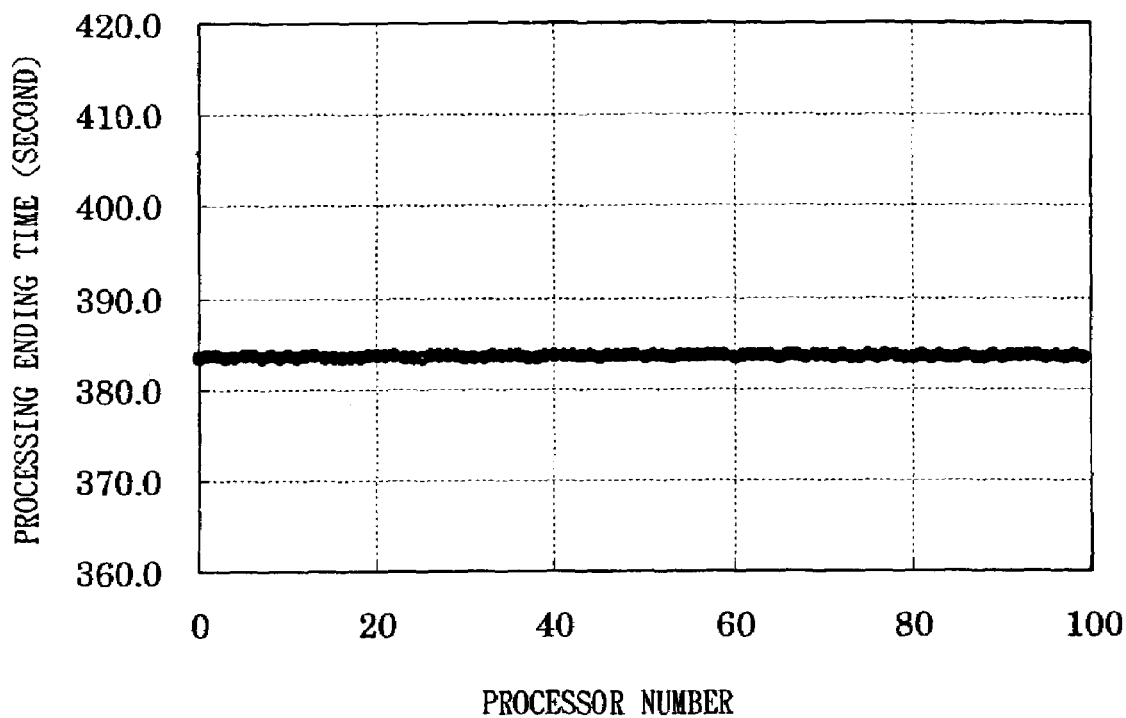
FIG. 16 is a diagram showing processing ending times of individual parallel processors according to the second embodiment of the present invention.
FIG. 17 is a diagram to which reference will be made in explaining a job group dividing method and a job assignment method according to a third embodiment of the present invention.

FIG. 16 shows a processing ending time of each processor element obtained when the number of the processor elements is approximately 100 in the second inventive example. This corresponds to FIG. 10 in the first inventive example. From this sheet of drawing, it becomes clear that calculation loads are equally distributed to the parallel processor elements to thereby decrease the fluctuations of the ending time.

When the first job of the assignment queue is set to a job in which an RT pair number is maximum and the preceding number is set to J, Job whose number is N-J if J is not greater than N/2
Job whose number is N-J-1 if J is not less than N/2 are set to the next job that will be assigned to the processor element. Also in this case, there can be achieved similar effects to those described above.

Similar effects can be achieved by making the assignment queue with a similar method such that when a job of an arbitrary number is set to the first job and the preceding number is set to J, Job whose number is N-J-1 if J is not greater than N/2
Job whose number is N-J if J is not less than N/2 is set to the next job that will be assigned to the processor element and that when its number becomes less than 0 or becomes greater than the maximum RT pair number, assignment of a job whose job number is half of the maximum RT pair number is re-started and the next job number is determined by a similar procedure.

In the second inventive example, a divide operation used to describe conditions required when the job number of the job that will be assigned next is an accurate divide operation which calculates a quotient to less than floating points and differs from the divide operation of integer used in the third inventive example and the following inventive examples.

[Third Inventive Example of Job Assignment Method]

In the third inventive example, a plurality of processor elements is divided into groups and a plurality of jobs is divided into groups of the same number in correspondence therewith. Assignment queues are prepared for respective groups, respectively.

Specifically, a plurality of processor elements is divided into G (G is an integer not less than 2) processor groups in which the numbers of the processor groups within the groups are nearly equal, and a plurality of jobs is divided into G job groups of the same number as that of the processor groups and wherein the numbers of jobs belonging to the groups are nearly equal.

Then, the processor groups and the job groups are made corresponding in a one-to-one relation, and jobs belonging to one job group are assigned to the processor elements located within corresponding one processor group.

The assignment method will be described. First, jobs in which job sizes comprising the communication time and the calculation time and the ratios between the communication times and the calculation times are approximate to each other are assigned to the processor elements in such a manner that they may belong to different job groups. Further, jobs in which the job sizes and the ratios between the communication times and the calculation times are approximate to each other are assigned to the processor elements in such a manner that the orders of assignments within a plurality of groups may differ from each other within the respective job groups in order to prevent their assignment orders from overlapping with those of other processor groups.

A specific example of making a plurality of queues corresponding to a plurality of job groups in a one-to-one relation according to the third inventive example will be described with reference to FIGS. 17 and 18 in the simple case in which the group number G is 4 and the job number N is 33.

Figures 18, 19:
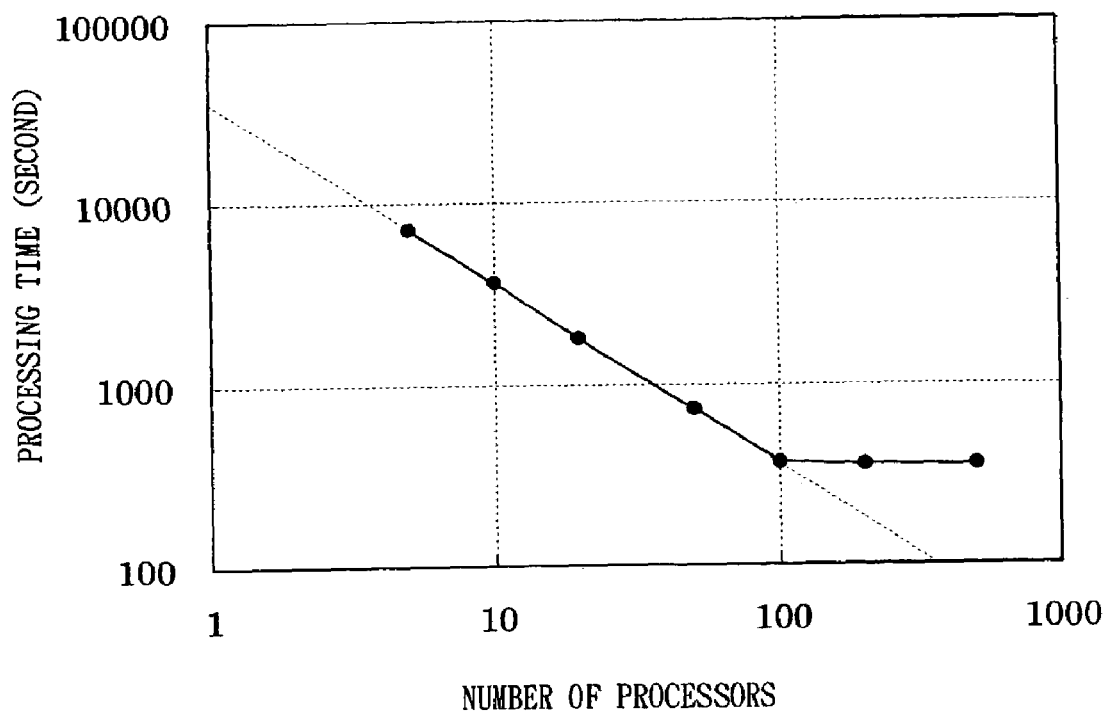
FIG. 18 is a diagram showing examples of queue matrixes that are used to assign jobs to processor elements.
FIG. 19 is a diagram showing a relationship between the number of parallel processors and SCF calculation processing time according to the third embodiment of the present invention.

Similarly to the aforementioned example, in FIGS. 17 and 18, numerals in the outside of parentheses denote job numbers, i.e. RT pair numbers and numerals in the inside of parentheses denotes order in which jobs are assigned within the job groups assigned to the same queue.

First, as shown in FIG. 17, respective jobs are distributed into groups of the number g that corresponds to a remainder obtained when the job number J is divided by the job group number (queue number) G. Distributed jobs are temporarily arranged in the sequential order of numbers within each queue.

Next, a block is divided by a quotient obtained when the job number J is divided (division of integer that rounds off numbers less than the floating point. This relationship applies for the following description as well) by the group number G. In the example of FIG. 17, each block number b is its quotient.

A plurality of jobs belonging to each block number b have job numbers that are close to each other, have job sizes that are close to each other and have ratios between the communication times and the calculation times that are close to each other as shown in FIG. 12. These jobs are distributed into different queues.

When B assumes a quotient obtained by dividing the whole job number N with the group number G, if the whole job number N is a multiple of the group number G, then the number of blocks becomes B. If not, then this number of blocks becomes B+1. In the latter case, there exist a queue which has a job number at the last block and a queue which has no job number at the last block.

Next, of the jobs within the g-th job group (g-th queue), jobs that are contained in job blocks of numbers not less than x×g and which are less than x×(g+1) where x represents the quotient obtained when B is divided by the group number G are set to the first jobs. The reason for this is to prevent jobs within the same block from being set to the same order in a plurality of job groups.

In the example of FIG. 14, since B=N/G=33/4=8 and x=B/G=8/4=2, if a job group is a job group of 0-th queue, then starting jobs are selected from a block of number 0 or 1 that is not less than x×g=2×0 and less than x×(g+1)=2×1=2. In this example, minimum numbers which can conform to the above-described conditions were selected as starting jobs.

Although the above-mentioned method applies for the following examples of calculation as well, the present invention is not limited thereto and starting numbers may be arbitrarily selected from numbers that can conform to the conditions.

Next, in each job group, when the job that has been assigned just before is contained in the b-th job block, a job belonging to the b+1-th job block is selected as the next job number. However, when the job belonging to the g-th group is not contained in the b+1-th job block, a job belonging to the 0-th job block is selected as the next job.

In the job group of the first queue in the example of FIG. 14, a job next to the job of a number 25 contained in the b=6-th block becomes a job of a number 29 contained in a b+1=7-th block, and the next job becomes a job of a number 1 within a 0-th block (because job of the first group is not contained in the eighth block).

While the next job is selected to be the job belonging to the b+1-th job block in this example, the present invention is not limited thereto and the next job is selected to be a job belonging to a b−1-th job block. In this case, when b−1 becomes a negative number, a job belonging to the job group of the maximum number that contains jobs of the g-th group is selected to be the next job.

FIG. 18 shows queues of respective job groups in which the orders are determined as described above and the job numbers are rearranged in accordance with the assignment order within each job group.

FIG. 19 shows a relationship between the processing time and the number of processor elements in the calculation of the third inventive example.

Molecule to be calculated and basis functions used therein are the same as those used in the first inventive example. Processor capabilities of respective processor elements were equal to each other, and five processor elements constituted one processor group in this example.

A study of FIG. 19 reveals that, according to the third inventive example, the calculation time obtained when the number of the processor element is approximately 100 can decrease about 12% as compared with the results shown in FIG. 8. Thus, processing at higher speed than that of the second inventive example becomes possible.

Figure 20:
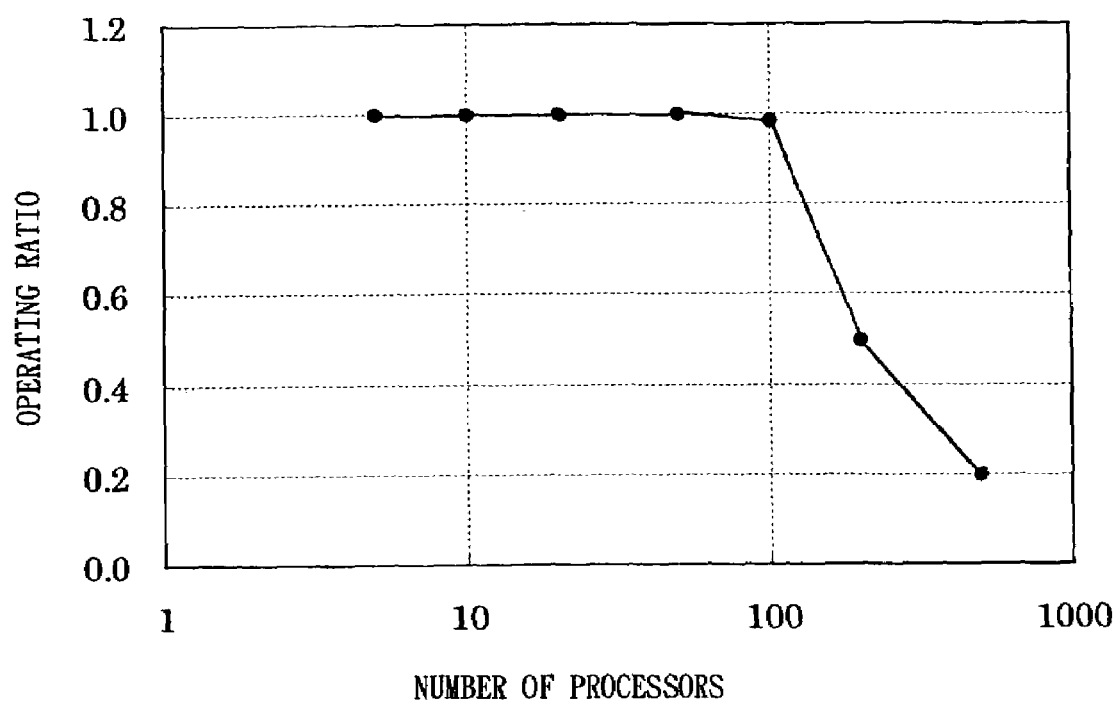
FIG. 20 is a diagram showing a relationship between the number of parallel processors and the operating ratio of processors according to the third embodiment of the present invention.

FIG. 20 shows a relationship between the operating ratio of the processor element and the number of the processor elements in the example of calculation according to the third inventive example and corresponds to FIG. 9 in the description of the first inventive example. From this sheet of drawing, it is to be understood that the operating ratio obtained when the number of the processor elements is approximately 100 could increase and reached approximately 100% as compared with the results of the first inventive example.

Figure 21:
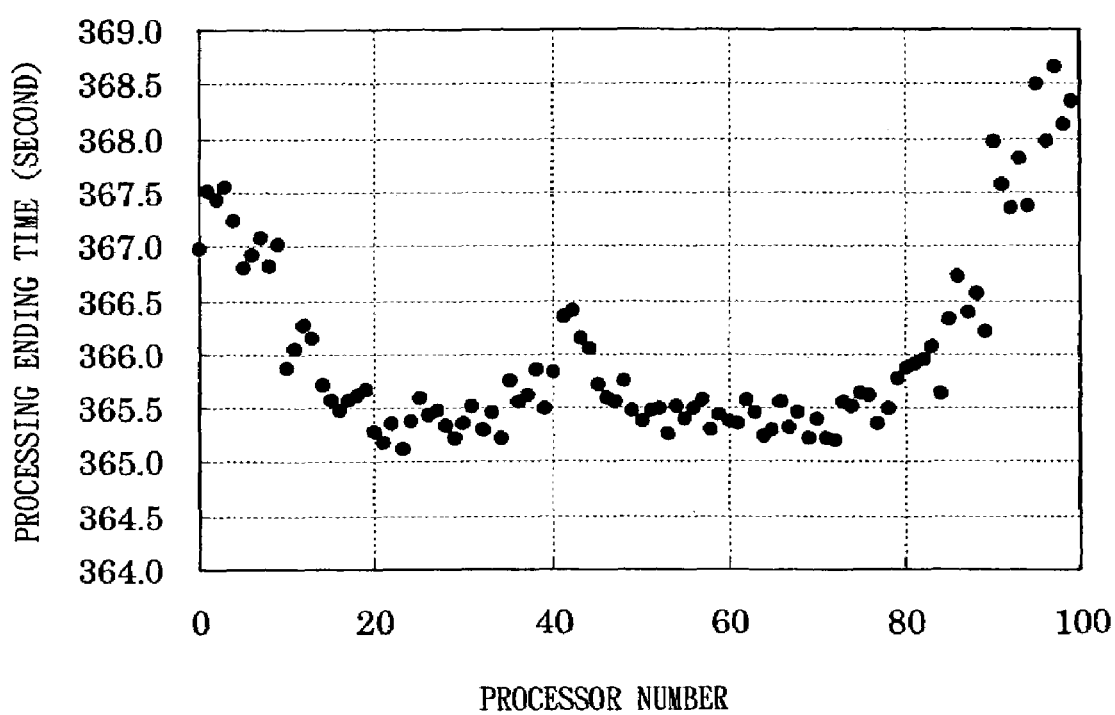
FIG. 21 is a diagram showing processing ending times of individual parallel processors according to the third embodiment of the present invention.

FIG. 21 shows the processing ending time of each processor element measured when the number of the processor elements is 100 according to the third inventive example.

From this, it is to be understood that, although the processing ending time has a fluctuation of about 4 seconds, loads are distributed to the parallel processor elements nearly equally.

[Fourth Inventive Example of Job Assignment Method]

Although the fourth inventive example is similar to the third inventive example in that the processor element is divided into groups and the assignment queues are prepared for each group, it differs from the third inventive example in a method of dividing the processor element into groups.

A method of making queues which correspond to a plurality of job groups according to the fourth inventive example will be described with reference to FIGS. 22 and 23 in the simple case wherein the group number G is 4 and the job number N is 33. Similarly to the aforementioned inventive examples, numerals in the outside of the parentheses denote the job numbers, i.e. RT pair numbers and the numerals in the inside of the parentheses denote the order in which jobs are assigned within the job groups assigned to the same queue.

First, as shown in FIG. 22, jobs are distributed in such a fashion that jobs in which a remainder obtained when the job number J is divided by 2×G that is twice the job group number (number of queues) G is equal to g or 2×G−g−1 may be contained in the g-th group. Then, the jobs thus distributed are temporarily arranged in the sequential order of numbers within each queue.

Then, the group is divided into blocks by a quotient obtained when the job number J is divided by the group number G (division of integer that rounds off numbers less than floating point is used, and this division applies for the following calculations as well). In FIG. 22, each block number b is its quotient.

When B assumes a quotient obtained by dividing the whole job number N with the group number G, if the whole job number N is a multiple of the group number G, then the block number becomes equal to B. If not, then the block number becomes equal to B+1. In the latter case, there are queues in which the last block has the job number and queues in which the last block does not have the job number.

Next, of the jobs within the g-th job group (g-th queue), jobs contained in job block of the numbers that are not less than x×g and less than x×(g+1) where x represents the quotient obtained when B is divided by the group number G are selected to be the first jobs. The reason for this is to prevent jobs within the same block from being placed in the same orders in a plurality of job groups.

In the example of FIG. 22, since B=N/G=33/4=8 and x=B/G=8/4=2, if the group is the 0-th queue, then the starting job is selected from a block of number 0 or 1 that is not less than x×g=2×0=0 and less than x×(g+1)=2×1=2. In this example, the minimum number that can conform to the above-described conditions is selected as the starting job.

While the above-mentioned method has applied for the following examples of calculation as well, the present invention is not limited thereto and a starting number may be arbitrarily selected from numbers that can conform to the above conditions.

Next, in each job group, when the immediately-assigned job is contained in the b-th job block, a job within the b+1-th job block is selected as the next job number. However, in this case, when the b+1-th job block does not contain the job within the g-th group, a job within the 0-th job block is selected as the next job.

In the group of the first queue in the example shown in FIG. 22, the job next to the job having the number 25 contained in the b=6th block is a job having a number 30 contained in a b+1=7th block, and then the next job is a job having a number 1 within the 0-th block (because the 8th block does not contain the job within the first group).

While the next job is the job within the b+1-th job block in this example, the present invention is not limited thereto and the next job may be a job that belongs to the b−1-th job block. In this case, when b−1 becomes a negative number, a job that belongs to the job block of the maximum number which contains jobs of the g-th group.

FIG. 23 shows queues of respective job groups in which the assignment orders are determined as described above and the job numbers are rearranged in accordance with the assignment orders within each job group.

Figure 24:
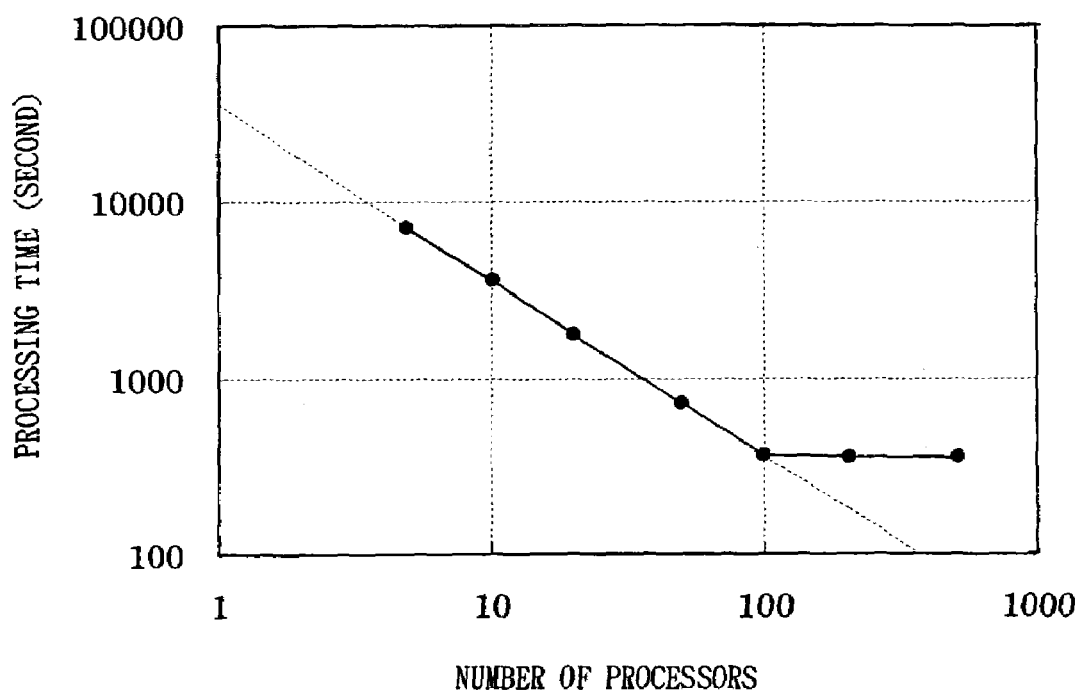
FIG. 24 is a diagram showing a relationship between the number of parallel processors and SCF calculation processing times according to the fourth embodiment of the present invention.

FIG. 24 shows a relationship between the processing time and the number of the processor elements in the calculation according to the fourth inventive example. Molecule that is to be calculated and basis functions used therein are the same as those used in the first inventive example. Processor capabilities of five processor elements were made equal to each other and the five processor elements constituted one processor group in this example.

A study of FIG. 24 reveals that, according to the fourth inventive example, the calculation time obtained when the number of the processor element is approximately 100 can decrease about 12% as compared with the results shown in FIG. 8. Thus, processing at higher speed than that of the second inventive example becomes possible.

FIG. 25 shows a relationship between the operating ratio of the processor element and the number of the processor elements in the example of calculation according to the fourth inventive example and corresponds to FIG. 9 in the description of the first inventive example. From this sheet of drawing, it is to be understood that the operating ratio obtained when the number of the processor elements is approximately 100 could increase and reached approximately 100% as compared with the results of the first inventive example.

FIG. 26 shows the processing ending time of each processor element measured when the number of the processor elements is 100 according to the fourth inventive example. From this, it is to be understood that, although the processing ending time has a fluctuation of about 3.5 seconds, loads are distributed to the parallel processor elements nearly equally.

[Fifth Inventive Example of Job Assignment Method]

The fifth inventive example is similar to the third and fourth inventive examples in that the processor element and the job are divided into groups in a one-to-one relation and that assignment queues are prepared for each group and is also similar to the third inventive example in the method of dividing the processor element into groups, it differs from the third and fourth inventive examples in a method of determining the assignment order within the group.

A method of making a plurality of queues corresponding to a plurality of job groups according to the fifth inventive example will be described with reference to FIGS. 27 and 28 in the simple case in which the group number G is 4, the job number N is 65 and the number of the processor elements per group is 2. In FIGS. 27 and 28, numerals in the outside of parentheses denote job numbers, i.e. RT pair numbers and numerals in the inside of parentheses denote the order in which jobs are assigned within the job groups assigned to the same queue similarly to the aforementioned inventive examples.

First, as shown in FIG. 27, respective jobs are distributed into groups of the number g that corresponds to a remainder obtained when the job number J is divided by the job group number (queue number) G. Although this distribution method is similar to that of the third inventive example, the present invention is not limited thereto and jobs may be distributed by a method similar to that of the fourth inventive example. Distributed jobs are temporarily arranged in the sequential order of numbers within each queue.

Next, a block is divided by a quotient obtained when the job number J is divided (division of integer that rounds off numbers less than the floating point is used. This relationship applies for the following description as well) by the group number G. In FIG. 22, each block number b is its quotient.

When B assumes a quotient obtained by dividing the whole job number N with the group number G, if the whole job number N is a multiple of the group number G, then the number of blocks become equal to B. If not, then this number of blocks becomes equal to B+1. In the latter case, there are queues which the last block has the job number and queues in which the last block does not have the job number.

Next, of the jobs within the g-th job group (g-th queue), jobs that are contained in job blocks of numbers not less than y×g and less than y×(g+1) where x represents the quotient obtained when B is divided by the group number G and y represents the quotient obtained when x is divided by the number m of the processor elements are set to the first jobs. The reason for this is to prevent jobs within the same block from being set to the same order in a plurality of job groups.

In the example of FIG. 27, since B=N/G=65/4=16, x=B/G=16/4=4 and y=x/m=4/2=2, if the job group is 0-th queue, then starting job is selected from a block of number 0 or 1 that is not less than y×g=2×0 and less than y×(g+1)=2×1=2. In this example, the minimum number that can conform to the above-described conditions is selected as the starting job.

Next, in each job group, when the job that has been assigned just before is contained in the b-th job block, the job belonging to the (b+B/m)-th job block is selected as the next job number. However, if the job within the g-th job group is not contained within (b+B/m)-th job block, then a job that belongs to the job block of the number equal to the remainder obtained when b+1 is divided by (B/m) is selected as the next job.

In the group of the first queue in the example of FIG. 27, a job of the number 61 contained in the b+(B/m)=7+(16/2)=15-th block is selected as the job next to the job of the number 29 contained in the b=7-th block. Since b=15 and job of the first group contained in the b+(B/m)=15+(16/2)=23rd block does not exist, a job of the number 1 that belongs to the 0-th block that is equal to the remainder obtained when b+1=16 is divided by (B/m)=8 is selected as the next job.

While the job that belongs to the (b+B/m)-th job block is selected as the next job in this example, the present invention is not limited thereto and a job that belongs to (b–B/m)-th job block may be selected as the next job. In this case, if (b–B/m) is negative and b is equal to 0, then of job blocks of the numbers in which the remainder of the division of (B/m) becomes equal to (B/m)–1, a job that belongs to a job block of maximum number containing jobs of the g-th group is selected as the next job. At the same time, if (b–B/m) is negative and b is not equal to 0, then of job block numbers which become equal to the remainder obtained when b–1 is divided by (B/m), a job that belongs to a job block of a maximum number containing jobs of the g-th job group is selected as the next job.

FIG. 28 shows queues in which the orders are determined as described above and the job numbers are rearranged in accordance with the assignment orders within the groups.

FIG. 29 shows a relationship between the processing time and the number of the processor elements in the calculation according to the fifth inventive example. Molecule that is to be calculated and basis functions used therein are the same as those used in the first inventive example. Processor capabilities of respective processor elements are made equal to each other, and five processor elements constituted one processor group in this example.

A study of FIG. 29 reveals that, according to the fifth inventive example, the calculation time obtained when the number of the processor element is approximately 100 can decrease about 13% as compared with the results shown in FIG. 8. Thus, processing at higher speed than those of the third and fourth inventive examples becomes possible.

Figure 30:
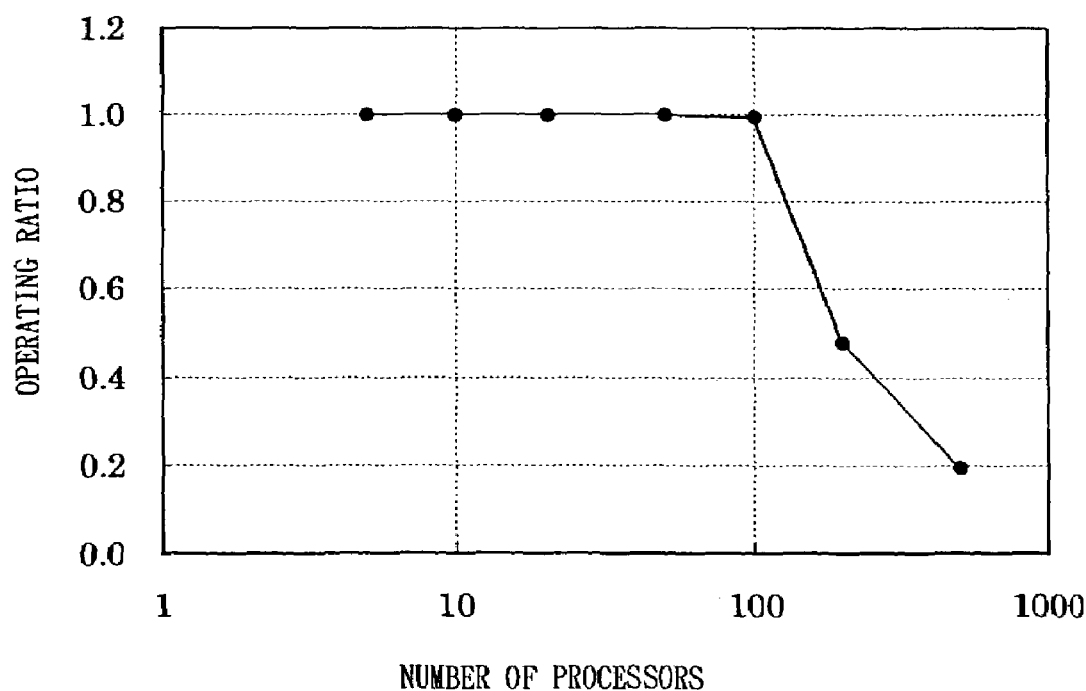
FIG. 30 is a diagram showing a relationship between the number of parallel processors and operating ratio of processors according to the fifth embodiment of the present invention.

FIG. 30 shows a relationship between the operating ratio of the processor element and the number of the processor elements in this example of calculation and corresponds to FIG. 9 in the description of the first inventive example. From this sheet of drawing, it is to be understood that the operating ratio obtained when the number of the processor elements is approximately 100 could increase and reached approximately 100% as compared with the results of the prior-art example.

FIG. 31 shows a processing ending time of each processor element when the number of the processor elements is 100 according to the fifth inventive example. From this, it could be confirmed that a fluctuation of the ending time is as small as about 1.5 seconds and that loads are distributed to the parallel processor elements equally.

While the five processor elements having the same processor performance constitute the processor group in the aforesaid third, fourth and fifth inventive examples, the number of the processor elements need not be limited to the above-mentioned number.

Further, the processor performances of all processor elements need not be the same and may be changed freely so long as a total processor performance within the processor group is made the same within the processor group by a suitable method such as when one processor group is composed of two processor elements having a processor performance twice as high as that of other processor element and other processor group is composed of four processor elements having one-time processor performance.

Furthermore, while the present invention has been described so far with reference to the case in which the RT parallel algorithm is used in ab initio molecular orbital calculation in the above-mentioned embodiment, the present invention is not limited thereto and can be applied to other parallel processing.

The invention claimed is:

1. In a parallel processing method for parallelly processing a plurality of jobs comprising communication processing between a host computer and a plurality of processors and calculation processing in said processors by said plurality of processors in a computer system comprising said host computer and said plurality of processors connected to said host computer through a common bus, a job assignment method in a parallel processing method characterized in that jobs are assigned to said processors in such a manner that an average value of ratios between communication times and calculation times of said job falls within a predetermined value; and a job assignment method in a parallel processing method characterized in that jobs are assigned to said respective processors in such a manner that an average value of ratios between communication times and calculation times of said jobs becomes equal to 1/(the number of said processors) when a whole communication time of said plurality of jobs is nearly equal to a total amount of calculation times in one job obtained when a plurality of jobs are equally assigned to said plurality of jobs.

2. In a parallel processing method for parallelly processing a plurality of jobs comprising communication processing between a host computer and a plurality of processors and calculation processing in said processors by said plurality of processors in a computer system comprising said host computer and said plurality of processors connected to said host computer through a common bus, a job assignment method in a parallel processing method characterized in that jobs are assigned to said processors in such a manner that an average value of ratios between communication times and calculation times of said job falls within a predetermined value; and a job assignment method in a parallel processing method characterized in that jobs in which ratios between communication times and calculation times is larger than said predetermined value or 1/(the number of said processors) and jobs in which ratios between communication times and calculation times are smaller than said predetermined value or 1/(the number of said processors) are alternately assigned to respective processors.

3. In a parallel processing method for parallelly processing a plurality of jobs comprising communication processing between a host computer and a plurality of processors and calculation processing in said processors by said plurality of processors in a computer system comprising said host computer and said plurality of processors connected to said host computer through a common bus, a job assignment method in a parallel processing method characterized in that said plurality of jobs are continuously numbered by integers ranging from N (N is an integer) to M (integer greater than N), a job that is numbered as N+(M−J−1) is assigned to the processor as the next job if the number J of the job that has been assigned just before is not greater than (N+M)/2 and a job that is numbered as N+(M−J) is assigned to the processor as the next job if the number J of the job that has been assigned just before is greater than (N+M)/2, otherwise a job that is numbered as N+(M−J) is assigned to the processor as the next job if the number J of the job that has been assigned just before is less than (N+M)/2 and a job that is numbered as N+(M−J−1) is assigned to the processor as the next job if the number J of the job that has been assigned just before is not less than (N+M)/2 and respective jobs are assigned to processors in such a manner that an average value of ratios between said communication times and said calculation times falls within a predetermined value.

4. In a method for parallel processing of a plurality of jobs, comprising a host computer and a plurality of processors connected by common bus, communication processing between said host computer and said processors, and calculation processing in said processors: a job assignment method wherein:

said plurality of processors is divided into G (G is an integer not less than 2) processor groups wherein the number of processors is equal within each group;
said jobs are divided into G job groups in which the number of jobs is equal within each group;
said processor groups and said job groups being associated with each other in a one-to-one relation;
jobs in each job group being assigned to processors within the corresponding processor group;

jobs in which sizes, said sizes comprising communication time and calculation time and ratios between said communication time and said calculation time, are approximately equal to each other belong to different job groups;
and jobs in which said sizes are approximately equal to each other are assigned to processors in such a manner that the assignment order of said jobs within said job groups differ from each other within said plurality of job groups.

5. In a job assignment method in a parallel processing method according to claim 4, a job assignment method in a parallel processing method characterized in that said plurality of jobs are numbered by integers ranging from N (N is an integer) to M (integer greater than N), g-th job group is comprised of jobs of numbers in which remainders of division by G are equal to g when the numbers of said jobs are replaced with numbers sequentially numbered as 0 and respective jobs are assigned to processors in such a manner that an average value of ratios between said communication times and said calculation times falls within a predetermined value.

6. In a job assignment method in a parallel processing method according to claim 5, a job assignment method in a parallel processing method characterized in that job being first assigned to processors within g-th job groups is a job within one of job blocks which are comprised of jobs having the job numbers whose quotients obtained when the job number J is divided by the processor group number G are equal to each other and which are the job blocks having numbers not less than (B/G)×g and less than (B/G)×(g+1) within the job blocks numbered with integers not less than 0 and not greater than B=(M−N+1)/G.

7. In a job assignment method in a parallel processing method according to claim 6, a job assignment method in a parallel processing method characterized in that, when a b-th job block contains a job that has been assigned just before within a g-th job group, a job belonging to (b+1)-th job block is assigned to a processor as the next job of said g-th job group if(b+1)-th job block contains a job of a g-th job group or a job belonging to a 0-th job block is assigned to a processor as the next job of said g-th job group if not, or a job belonging to a (b−1)-th job block is assigned to a processor as the next job of said g-th job group and a job of the largest number which is not yet assigned within said g-th job group is assigned to a processor as the next job of said g-th job group if not.

8. In a job assignment method in a parallel processing method according to claim 5, a job assignment method in a parallel processing method characterized in that job being assigned first to processors within g-th job groups related to a processor group in which the number of processor elements is m, is a job within one of job blocks which are comprised of jobs having the job numbers whose quotients obtained when the job number J is divided by the processor group number G are equal to each other and which are the job blocks having numbers not less than (B/G/m)×g and less than (B/G/m)×(g+1) within job blocks numbered with integers not less than 0 and not greater than B=(M−N+1)/G.

9. In a job assignment method in a parallel processing method according to claim 8, a job assignment method in a parallel processing method characterized in that, when a b-th job block contains a job that has been assigned just before within a g-th job group, jobs within a b+(B/m)-th job block are assigned to processors as the next jobs of said g-th job group if said b+(B/m)-th job block contains jobs of said g-th job group and jobs within a job group of the number equal to a remainder which is obtained by dividing b+1 with (B/m) if not or jobs within a b−(B/m)-th job block are assigned to processors as the next jobs of said g-th job group if b−(B/m) is not less than 0, jobs within a job block, which contain the jobs of the g-th job group, with the largest number among the numbers which remainder obtained being divided by (B/m) is equal to (B/m)−1 are assigned to processors if b is equal to 0 and jobs within a job block, which contain the jobs of the g-th job group, with the largest number among the numbers in which a remainder obtained being divided by (B/m) is equal to the remainder obtained by divided b+1 with (B/m) are assigned to processors as the next jobs of said g-th job group if b is other numerical value.

10. In a job assignment method in a parallel processing method according to claim 4, a job assignment method characterized in that said plurality of jobs are numbered by integers continuing from N (N is an integer) to M (integer greater than N), g-th group is comprised of jobs in which remainders obtained when job numbers are divided by 2×G are equal to g and jobs in which remainders obtained when job numbers are divided by 2×G are equal to (2×G−g−1) in the condition that the numbers of said jobs are replaced with sequential numbers from 0 and respective jobs are assigned to processors in such a manner that an average value of ratios between said communication times and said calculation times falls within a predetermined value.

11. In a job assignment method in a parallel processing method according to claim 10, a job assignment method in a parallel processing method characterized in that job being first assigned to processors within g-th job groups is a job within one of job blocks which are comprised of jobs having the job numbers whose quotients obtained when the job number J is divided by the processor group number G are equal to each other and which are the job blocks having numbers not less than (B/G)×g and less than (B/G)×(g+1) within the job blocks numbered with integers not less than 0 and not greater than B=(M−N+1)/G.

12. In a job assignment method in a parallel processing method according to claim 11, a job assignment method in a parallel processing method characterized in that, when a b-th job block contains a job that has been assigned just before within a g-th job group, a job belonging to (b+1)-th job block is assigned to a processor as the next job of said g-th job group if(b+1)-th job block contains a job of a g-th job group or a job belonging to a 0-th job block is assigned to a processor as the next job of said g-th job group if not, or a job belonging to a (b−1)-th job block is assigned to a processor as the next job of said g-th job group and a job of the largest number which is not yet assigned within said g-th job group is assigned to a processor as the next job of said g-th job group if not.

13. In a job assignment method in a parallel processing method according to claim 10, a job assignment method in a parallel processing method characterized in that job being assigned first to processors within g-th job groups related to a processor group in which the number of processor elements is m, is a job within one of job blocks which are comprised of jobs having the job numbers whose quotients obtained when the job number J is divided by the processor group number G are equal to each other and which are the job blocks having numbers not less than (B/G/m)×g and less than (B/G/m)×(g+1) within job blocks numbered with integers not less than 0 and not greater than B=(M−N+1)/G.

14. In a job assignment method in a parallel processing method according to claim 13, a job assignment method in a parallel processing method characterized in that, when a b-th job block contains a job that has been assigned just before within a g-th job group, jobs within a b+(B/m)-th job block are assigned to processors as the next jobs of said g-th job group if said b+(B/m)-th job block contains jobs of said g-th job group and jobs within a job group of the number equal to a remainder which is obtained by dividing b+1 with (B/m) if not or jobs within a b−(B/m)-th job block are assigned to processors as the next jobs of said g-th job group if b−(B/m) is not less than 0, jobs within a job block, which contain the jobs of the g-th job group, with the largest number among the numbers which remainder obtained being divided by (B/m) is equal to (B/m)−1 are assigned to processors if b is equal to 0 and jobs within a job block, which contain the jobs of the g-th job group, with the largest number among the numbers in which a remainder obtained being divided by (B/m) is equal to the remainder obtained by divided b+1 with (B/m) are assigned to processors as the next jobs of said g-th job group if b is other numerical value.

15. In a parallel processing method in which molecular orbital calculation for calculating energy of molecule expressed by n (n is a positive integer) contracted shells is executed by a computer system comprising a host computer and a plurality of processors, with respect to all matrix elements F(I, J) of Fock matrix F expressed in the form of a sum concerning all of primitive basis functions contained in contracted basis functions I, J composed of primitive basis functions i, j in a calculation of a sum f(I, J)=f1 (I, J)+f2(I, J), an outermost loop is selected as a loop concerning a combination of said contracted shell R and T which can satisfy relationships of R≦n max (n max represents the maximum value of numbers assigned to n contracted shells) and T≦R, a second loop in the inside of said outermost loop is selected as a loop concerning said contracted shell S, a third loop in the inside of said second loop is selected as a loop concerning said contracted shell U, or said second loop is selected as a loop concerning said contracted shell U and said third loop is selected as a loop concerning said contracted shell S, a range of values which said contracted shell S can take is selected to be not greater than R, a range of values which said contracted shell U can take is selected to be not greater than R, a predetermined two-electron integral and a part of a predetermined Fock matrix element using the result of said predetermined two-electron integral are calculated at the inside of said third loop, said second and third loops are collected as one job unit and processing is assigned to said processor at said job unit, a parallel processing method characterized in that said jobs are formed in such a manner that a low number is assigned to a job whose orbital quantum number of said contracted shell R is large and a high number is assigned to a job whose orbital quantum number of said contracted shell R is small, wherein f1(I, J) represents the sum concerning all contracted basis functions of products A1·P(K, L)·g(i,j, k, l) with a coefficient A1;

f2(i, j) represents the sum concerning all contracted basis functions of a product A2·P(K, L)·g(i, k, j, l) with a coefficient A2, g(i, j, k, l) represents the function value of a two-electron integral function g expressed by using primitive basis functions i, j, k, l which are components of primitive shells r, s, t, u contained in contracted shell R, D, T, U as indexes; and P(K, L) represents the element of density matrix P expressed by using a contracted basis function K composed of said primitive basis function k and a contracted basis function L composed of said primitive basis function I as indexes.

16. In a parallel processing method according to claim 15, a parallel processing method characterized in that respective jobs are assigned to each of said plurality of processors in such a manner that an average value of ratios between communication times and calculation times of said job falls within a predetermined value.

17. In a parallel processing method according to claim 16, a parallel processing method characterized in that respective jobs are assigned to each of said processors in such a manner that an average value of ratios between a communication times and a calculation times of said job is equal to 1/(the number of said processor) when a whole communication time of said plurality of jobs and a total of a calculation time of one job obtained when said plurality of jobs is equally assigned to said plurality of processors are nearly equal to each other.

18. In a parallel processing method according to claim 17, a parallel processing method characterized in that each of said plurality of processors has a job in which a ratio between a communication time and a calculation time is larger than said predetermined value or 1/(the number of said processor) and a job in which a ratio between a communication time and a calculation time is shorter than said predetermined value or 1/(the numbers of said processor) assigned thereto alternately.

19. In a parallel processing method according to claim 16, a parallel processing method characterized in that each of said plurality of processors has a job in which a ratio between a communication time and a calculation time is larger than said predetermined value or 1/(the number of said processor) and a job in which a ratio between a communication time and a calculation time is shorter than said predetermined value or 1/(the number of said processor) assigned thereto alternately.

20. In a parallel processing method according to claim 15, a parallel processing method characterized in that said plurality of processors is divided into G (G is an integer not less than 2) processor groups in which the number of said processors is equal within the each group, said plurality of jobs is divided into G job groups in which the number of said jobs is equal within the each group, said processors groups and said job groups are associated with each other in a one-to-one relation and jobs within one job group are assigned to processors within corresponding one processor group, jobs in which sizes comprising said communication time and said calculation time and ratios between said communication times and said calculation times are approximate to each other belong to different job groups of said job group and jobs in which sizes comprising said communication time and said calculation time and ratios between said communication times and said calculation times are approximate to each other are assigned to processors in such a manner that assignment order of said jobs within said job groups differ from each other within said plurality of job groups.

21. In a parallel processing method according to claim 20, a parallel processing method characterized in that a low contracted shell number is assigned to a contracted shell whose orbital quantum number is large and a high contracted shell number is assigned to a contracted shell whose orbital quantum number is small, said job numbers are determined in accordance with a calculation formula of $R(R+1)/2+T$ and numbered with integers continuing from N (N is an integer) to M (integer greater than N) and when said job numbers are replaced with ones numbered sequentially from 0, a g-th job group is composed of jobs of number in which a remainder obtained from division by said G is equal to g, whereby jobs are assigned such that an average Value of ratios between said communication times and said calculation times falls within a predetermined value.

22. In a parallel processing method according to claim 21, a parallel processing method characterized in that job being first assigned to processors within g-th job groups is a job within one of job blocks which are comprised of jobs having the job numbers whose quotients obtained when the job number J is divided by the processor group number G are equal to each other and which are the job blocks having numbers not less than $(B/G) \times g$ and less than $(B/G) \times (g+1)$ within the job blocks numbered with integers not less than 0 and not greater than $B=(M-N+1)/G$.

23. In a parallel processing method according to claim 21, a parallel processing method characterized in that job being assigned first to processors within g-th job groups related to a processor group in which the number of processor elements is m, is a job within one of job blocks which are comprised of jobs having the job numbers whose quotients obtained when the job number J is divided by the processor group number G are equal to each other and which are the job blocks having numbers not less than $(B/G/m) \times g$ and less than $(B/G/m) \times (g+1)$ within job blocks numbered with integers not less than 0 and not greater than $B=(M-N+1)/G$.

24. In a parallel processing method according to claim 23, a parallel processing method characterized in that, when a b-th job block contains a job that has been assigned just before within a g-th job group, a job belonging to (b+1)-th job block is assigned to a processor as the next job of said g-th job group if (b+1)-th job block contains a job of a g-th job group or a job belonging to a 0-th job block is assigned to a processor as the next job of said g-th job group if not, or a job belonging to a (b−1)-th job block is assigned to a processor as the next job of said g-th job group and a job of the largest number which is not yet assigned within said g-th job group is assigned to a processor as the next job of said g-th job group if not.

25. In a parallel processing method according to claim 23 a parallel processing method characterized in that, when a b-th job block contains a job that has been assigned just before within a g-th job group, jobs within a b+(B/m)-th job block are assigned to processors as the next jobs of said g-th job group if said b+(B/m)-th job block contains jobs of said g-th job group and jobs within a job group of the number equal to a remainder which is obtained by dividing b+1 with (B/m) if not or jobs within a b−(B/m)-th job block are assigned to processors as the next jobs of said g-th job group if b−(B/m) is not less than 0, jobs within a job block, which contain the jobs of the g-th job group, with the largest number among the numbers which remainder obtained being divided by (B/m) is equal to (B/m)−1 are assigned to processors if b is equal to 0 and jobs within a job block, which contain the jobs of the g-th job group, with the largest number among the numbers in which a remainder obtained being divided by (B/m) is equal to the remainder obtained by divided b+1 with (B/m) are assigned to processors as the next jobs of said g-th job group if b is other numerical value.

26. In a parallel processing method according to claim 20, a parallel processing method characterized in that a low contracted shell number is assigned to a contracted shell whose orbital quantum number is large, a high contracted shell number is assigned to a contracted shell whose orbital quantum number is small, said job numbers are determined in accordance with a calculation formula of $R(R+1)/2+T$ and numbered with integers continuing from N (N is an integer) to M (integer greater than N) and when said job numbers are replaced with ones numbered sequentially from 0, a g-th job group is composed of jobs in which a remainder obtained when a job number is divided by 2×G is equal to g and jobs in which a remainder obtained when a job number is divided by 2×G is equal to (2×G−g−1), whereby jobs are assigned such that an average value of ratios between said communication times and said calculation times falls within a predetermined value.

27. In a parallel processing method according to claim 26, a parallel processing method characterized in that job being first assigned to processors within g-th job groups is a job within one of job blocks which are comprised of jobs having the job numbers whose quotients obtained when the job number J is divided by the processor group number G are equal to each other and which are the job blocks having numbers not less than (B/G)×g and less than (B/G)×(g+1) within the job blocks numbered with integers not less than 0 and not greater than B=(M−N+1)/G.

28. In a parallel processing method according to claim 27, a parallel processing method characterized in that, when a b-th job block contains a job that has been assigned just before within a g-th job group, a job belonging to (b+1)-th job block is assigned to a processor as the next job of said g-th job group if(b+1)-th job block contains a job of a g-th job group or a job belonging to a 0-th job block is assigned to a processor as the next job of said g-th job group if not, or a job belonging to a (b−1)-th job block is assigned to a processor as the next job of said g-th job group and a job of the largest number which is not yet assigned within said g-th job group is assigned to a processor as the next job of said g-th job group if not.

29. In a parallel processing method according to claim 26, a parallel processing method characterized in that job being assigned first to processors within g-th job groups related to a processor group in which the number of processor elements is m, is a job within one of job blocks which are comprised of jobs having the job numbers whose quotients obtained when the job number J is divided by the processor group number G are equal to each other and which are the job blocks having numbers not less than (B/G/m)×g and less than (B/G/m)×(g+1) within job blocks numbered with integers not less than 0 and not greater than B=(M−N+1)/G.

30. In a parallel processing method according to claim 29, a parallel processing method characterized in that, when a b-th job block contains a job that has been assigned just before within a g-th job group, jobs within a b+(B/m)-th job block are assigned to processors as the next jobs of said g-th job group if said b+(B/m)-th job block contains jobs of said g-th job group and jobs within a job group of the number equal to a remainder which is obtained by dividing b+1 with (B/m) if not or jobs within a b−(B/m)-th job block are assigned to processors as the next jobs of said g-th job group if b−(B/m) is not less than 0, jobs within a job block, which contain the jobs of the g-th job group, with the largest number among the numbers which remainder obtained being divided by (B/m) is equal to (B/m)−1 are assigned to processors if b is equal to 0 and jobs within a job block, which contain the jobs of the g-th job group, with the largest number among the numbers in which a remainder obtained being divided by (B/m) is equal to the remainder obtained by divided b+1 with (B/m) are assigned to processors as the next jobs of said g-th job group if b is other numerical value.

31. In a parallel processing method according to claim 15, a parallel processing method characterized in that a low contracted shell number is assigned to a contracted shell whose orbital quantum number is large and a high contracted shell number is assigned to a contracted shell whose orbital quantum number is small, said job numbers are determined in accordance with a calculation formula of R(R+1)/2+T and numbered with integers continuing from N (N is an integer) to M (integer greater than N), if a number J of a job that has been assigned just before is not greater than (N+M)/2, then a job whose number is N+(M−J−1) is assigned as the next job and if a number J of a job that has been assigned just before is greater than (N+M)/2, then a job whose number is N+(M−J) is assigned as the next job, or if a number J of a job that has been assigned just before is smaller than (N+M)/2, then a job whose number is N+(M−J) is assigned as the next job and if a number J of a job that has been assigned just before is not less than (N+M)/2, then a job whose number is N+(M−J−1) is assigned as the next job, whereby jobs are assigned such that an average value of ratios between said communication times and said calculation times falls within a predetermined value.

* * * * *